May 30, 1950 J. M. BLACKHALL 2,509,416

AUTOMATIC TELEPHONE SYSTEM

Filed March 19, 1945 9 Sheets-Sheet 1

INVENTOR
JAMES M. BLACKHALL
BY George A. Auer
ATTORNEY

May 30, 1950 J. M. BLACKHALL 2,509,416

AUTOMATIC TELEPHONE SYSTEM

Filed March 19, 1945 9 Sheets-Sheet 2

INVENTOR
JAMES M. BLACKHALL
BY
George A. Auer
ATTORNEY

May 30, 1950 J. M. BLACKHALL 2,509,416

AUTOMATIC TELEPHONE SYSTEM

Filed March 19, 1945 9 Sheets-Sheet 3

INVENTOR
JAMES M. BLACKHALL
BY
George A. Auer
ATTORNEY

May 30, 1950 J. M. BLACKHALL 2,509,416

AUTOMATIC TELEPHONE SYSTEM

Filed March 19, 1945 9 Sheets-Sheet 4

INVENTOR
JAMES M. BLACKHALL

BY George A. Auer

ATTORNEY

May 30, 1950 J. M. BLACKHALL 2,509,416

AUTOMATIC TELEPHONE SYSTEM

Filed March 19, 1945 9 Sheets-Sheet 5

INVENTOR
JAMES M. BLACKHALL
BY
George A. Auer
ATTORNEY

May 30, 1950

J. M. BLACKHALL 2,509,416

AUTOMATIC TELEPHONE SYSTEM

Filed March 19, 1945

9 Sheets-Sheet 6

INVENTOR
JAMES M. BLACKHALL

BY

George A. Auer

ATTORNEY

May 30, 1950 J. M. BLACKHALL 2,509,416

AUTOMATIC TELEPHONE SYSTEM

Filed March 19, 1945 9 Sheets-Sheet 7

INVENTOR
JAMES M. BLACKHALL
BY
George A. Auer
ATTORNEY

AUTOMATIC TELEPHONE SYSTEM

Filed March 19, 1945 9 Sheets-Sheet 8

INVENTOR.
JAMES M. BLACKHALL

BY George A. Auer

ATTORNEY

May 30, 1950 J. M. BLACKHALL 2,509,416

AUTOMATIC TELEPHONE SYSTEM

Filed March 19, 1945 9 Sheets-Sheet 9

*INVENTOR.*
JAMES M. BLACKHALL

*BY*

George A. Auer

ATTORNEY

Patented May 30, 1950 2,509,416

UNITED STATES PATENT OFFICE 2,509,416

AUTOMATIC TELEPHONE SYSTEM

James M. Blackhall, Genoa, Ill., assignor to Leich Electric Company, Genoa, Ill., a corporation of Illinois Application March 19, 1945, Serial No. 583,567

43 Claims. (Cl. 179—22)

This invention relates to signalling systems, and is particularly concerned with new and improved switching apparatus and circuits for use in automatic telephone systems of the general type disclosed in U. S. Patents Nos. 2,307,757 and 2,396,077.

The apparatus described in these patents is of a special type which may be referred to, for the sake of convenience, as crossbar switching apparatus. The principal features of these prior disclosures, and especially of the disclosure in Patent No. 2,396,077, are briefly outlined below, for the purpose of supporting the understanding of the present invention which will presently be discussed in detail.

The line and test conductors are bare strip- or bar-like members arranged in a bank, in a plurality of sub-groups. These members will be referred to as —bars—. Assuming that the apparatus is used as a line finder, in a 100-line system, and that there are in the exchange equipment two line conductors and one test conductor for each subscribers' line, the line bank multiple of the switching mechanism will contain 100 sets of bars, each set comprising two line and one test bar and representing a subscribers' line. There are thus 200 line bars and 100 test bars, or a total of 300 bars. These bars are arranged in vertically extending subscribers' sub-groups each having 10 lines, or a total of 30 bars. Ten such sub-groups are disposed vertically in parallel to each other.

A desired number of trunk lines may be provided, each having two line conductors and one test conductor. These trunk lines give access to equipment for completing calls. Each trunk line with its three conductors terminates in an individual trunk or bank unit which extends transversely of the bare strip-like conductors or bars forming the line bank multiple. Each trunk unit contains the switching means for selectively connecting any one set of three bars, representing the three conductors of any one of the 100 subscribers' lines, with the conductors of the trunk line served by the trunk unit. The three conductors of the trunk line are for this purpose multipled to ten sets of extensions, each set having three extensions, forming in this manner ten sets of stationary trunk contacts each comprising three contacts.

The switching means comprises in each trunk or bank unit a plurality of bank springs forming links or intermediate trunk elements, ten for each conductor of the corresponding trunk line, or a total of thirty intermediate trunk elements.

These trunk elements are disposed transversely of the line bank multiple in a plurality of horizontally extending vertically superposed levels. Each trunk element forms ten resilient contact fingers for selective engagement with the corresponding line and test bars, and an eleventh contact finger for connection with the corresponding stationary trunk contact.

Vertically extending, vertically movable tens actuators are provided, one for each subscribers' sub-group of lines, or a total of 10 tens actuators. Each of these tens actuators is equipped with 30 projections for moving the corresponding resilient contact fingers of the intermediate trunk elements into engagement with the associated line and test bars.

The eleventh resilient contact finger of each intermediate trunk element is disposed near one edge of the trunk or bank unit. There are ten vertically superposed sets of such auxiliary eleventh fingers, each set comprising three fingers for coaction with associated stationary trunk contacts. One vertically movable units actuator is provided for each set of three of these auxiliary element contact fingers. There are thus ten of these units actuators and each is equipped with three projections for engagement with the three eleventh auxiliary contact fingers of the corresponding set of intermediate trunk elements, for the purpose of moving these contact fingers into engagement with their associated stationary trunk contacts.

A test unit is provided which is structurally similar to the trunk units, but is equipped only with tens actuators for operating resilient contact fingers into engagement with test bars of the line bank multiple. The test unit aids in the control of the operation of the units actuators in all the trunk units.

The connection of any one set of two line bars and one test bar, representing in the line bank multiple any given subscribers' line, with the three conductors of the trunk line terminating in a given bank or trunk unit, depends on the operation of the proper tens actuator of such unit to connect the line and test bars of the line with the corresponding intermediate trunk elements, and on the operation of the proper units actuator of the unit to connect the auxiliary eleventh contact fingers of the selected intermediate trunk elements with the associated stationary contacts of the conductors of the trunk line.

In the apparatus made in accordance with the disclosure in Patent No. 2,396,077, the selection of the tens and units actuators is accomplished by a special selection control unit which is common to all the trunk or bank units of the apparatus. The selection control unit is equipped with means for selectively actuating tens and units selection solenoids which in turn operate associated tens and units selector bars. The selector bars extend throughout the switching apparatus, common to all trunk units, and are disposed alongside and in parallel with the line bank multiple.

The selector bars of the prior disclosure are adapted to actuate clutches for coupling associated tens and units actuators in all trunk units with certain operating members individual to each unit. The operating members of one (idle) trunk unit are thereupon actuated by a so-called "trunk or gate magnet" and move the selected and coupled tens and units actuators to actuate the resilient contact fingers of the intermediate trunk elements for the purpose of completing the connection of the three line and test bars of a given subscribers' line, with the three conductors of the trunk line terminating in the trunk unit.

The apparatus made in accordance with the present invention preserves and retains the essential features and advantages of the apparatus disclosed in Patent No. 2,396,077, as outlined above, and provides improvements which are valuable from the standpoint of manufacture and operation and which increase the flexibility of the apparatus and facilitate the maintenance thereof. Among the salient new objects and features are the following:

The present disclosure provides a switching apparatus having bank or trunk units each equipped with individual or integral tens and units selection means. The common selection control unit of the prior disclosure and the common tens and units selection means thereof are eliminated.

The arrangement of the means forming in each trunk unit the conductors of the trunk line, which are multipled to the various levels of the unit, is simplified to eliminate numerous soldering points and to facilitate the manufacture, as well as the assembling and maintenance of the apparatus.

A new terminal assembly is provided, which comprises a terminal member removably attached to each trunk unit and common thereto, carrying tabs for receiving all conductors for the trunk unit which radiate from a common cable, and having a plurality of terminal sub-sections removably jacked to the common terminal member, each sub-section carrying the conductors which are individual to and are wired to certain predetermined operating sections of the trunk unit.

The overall improvement resulting from these and additional features, which will be brought out in the detailed description, presents advantages which result in the use of smaller and more direct acting forces; elimination of close tolerances; lower initial tool investment and inventory of different parts; reduction to a minimum of time and skill for assembling, repair, removal or addition of parts of a trunk unit and of the trunk unit as a whole; and reduction of vulnerability to failure of each bank or trunk unit and its operating parts.

Details, including the aforementioned and additional objects and features, will be brought out in the course of the description of an embodiment of the invention which will be rendered with reference to the accompanying drawings. In these drawings, Fig. 1 is a diagrammatic representation of a complete switching apparatus or mechanism constructed in accordance with the invention, showing its principal parts;

Figure 13:
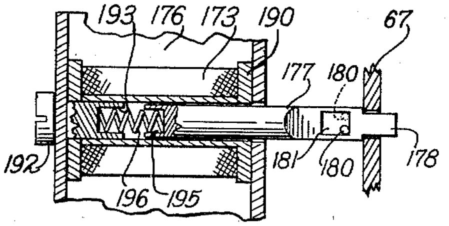
Figure 14:
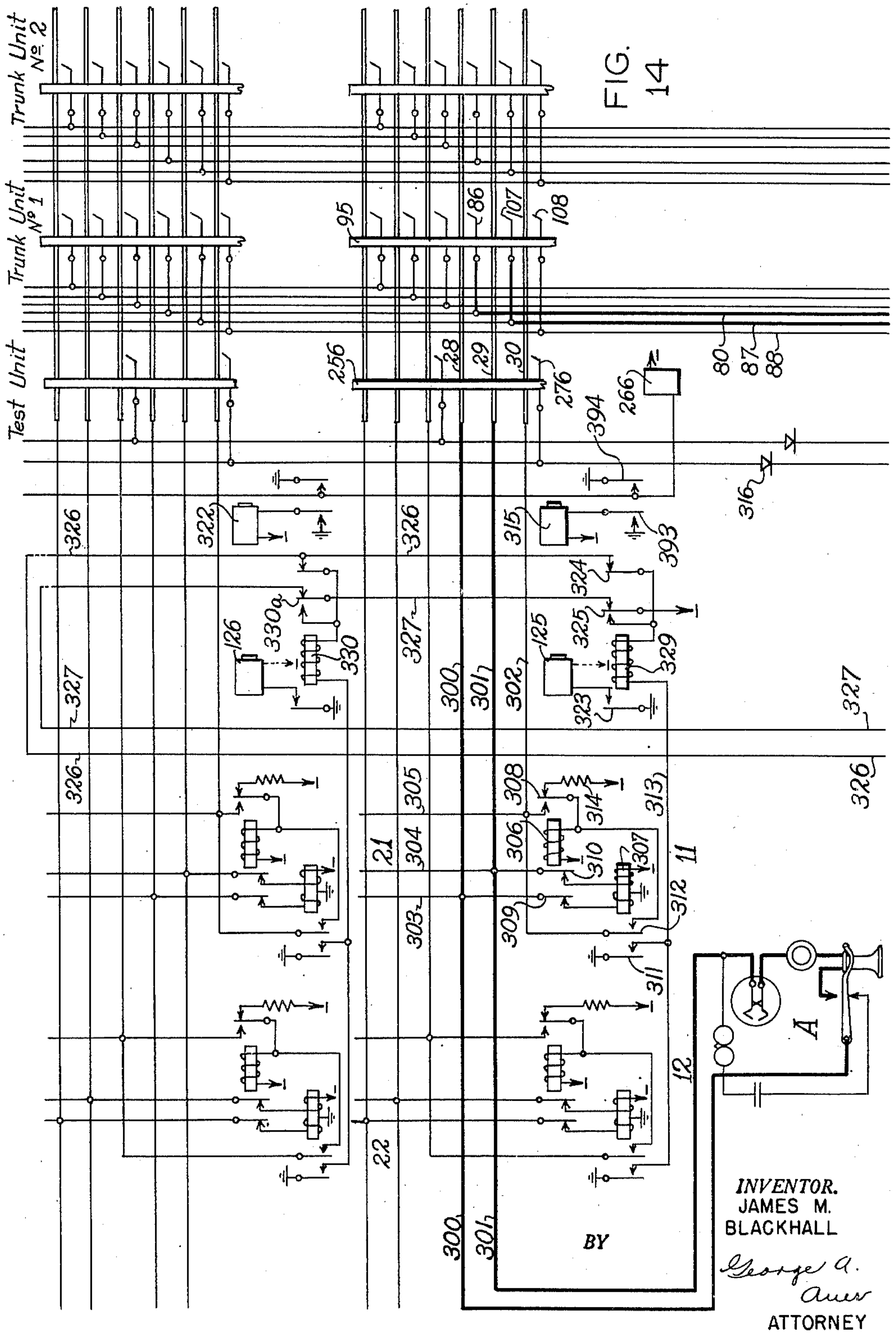
Figure 15:
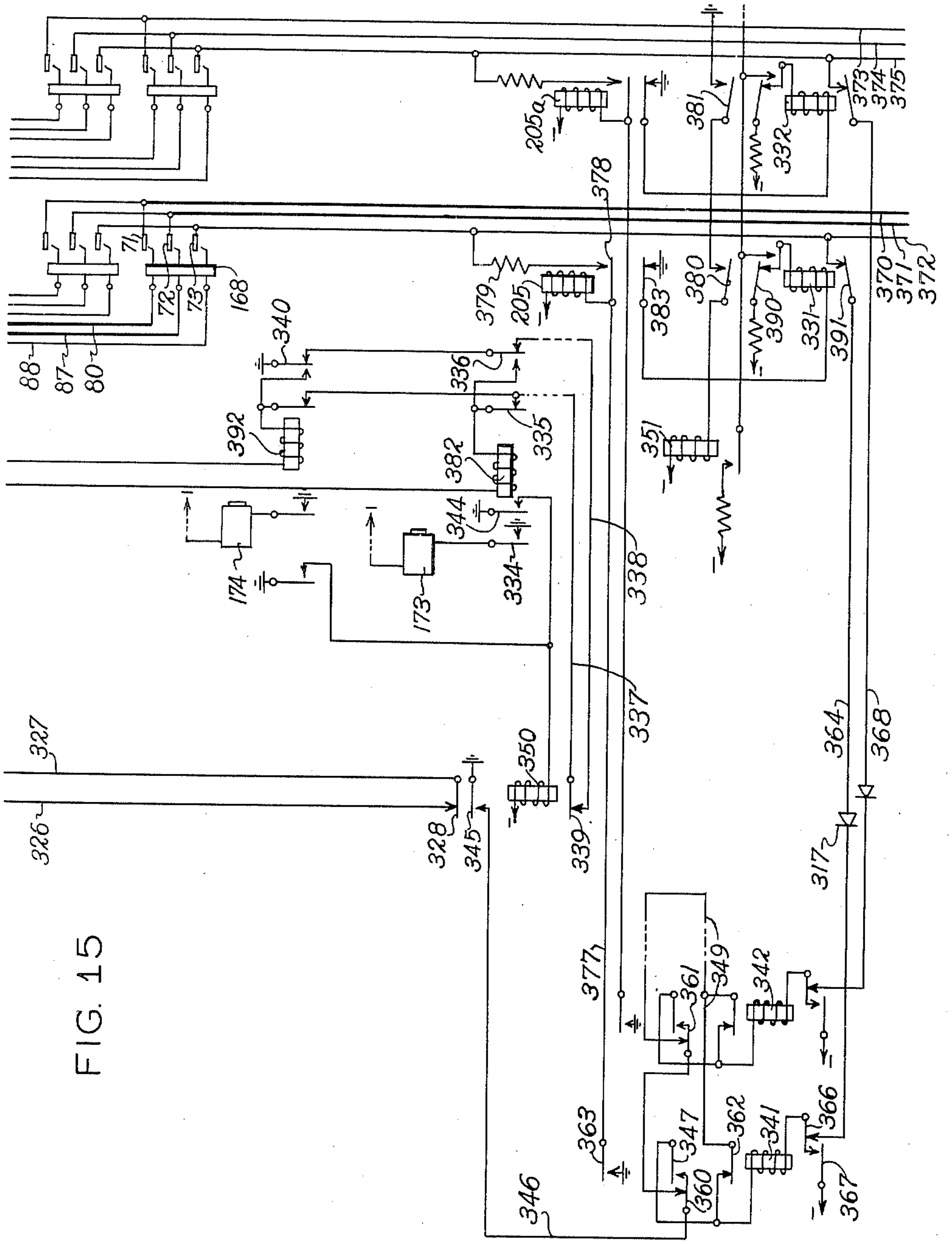

Fig. 13 shows diagrammatically, on a somewhat enlarged scale, details of the structure of one of the units selection solenoids or magnets for coupling a units actuator with the operating member; and Figs. 14 and 15, taken together, represent a circuit diagram for the switching mechanism comprising a number of switching units when used to perform the functions of finder switches in an automatic telephone system.

Figure 1:
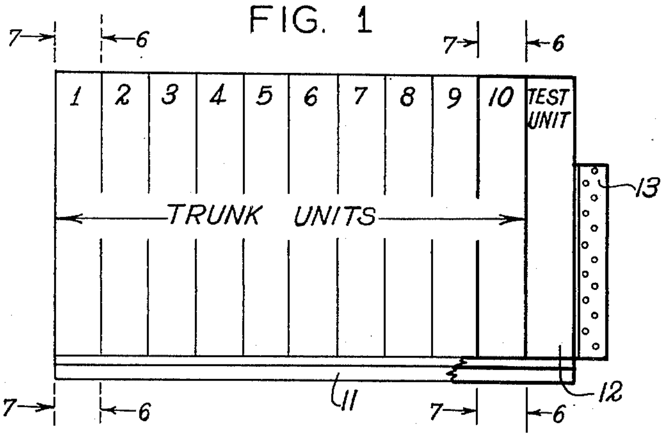

The switching apparatus shown in Fig. 1 comprises a base 11 on which are supported a plurality of trunk or bank units indicated by the numerals 1–10, inclusive, a test unit 12 and a terminal assembly 13. The test unit 12 and the terminal assembly 13 are common to all the trunk units, of which there may be any desired number within practical requirements. Ten trunk units are indicated in the drawings, which is assumed to be the full capacity of the base shown. A smaller number of trunk units may be supplied, say six or seven, the rest to be added as required. On the other hand, a longer base may be provided, having a capacity of fifteen or more trunk units in addition to the test unit shown.

It will be understood from the foregoing that the trunk units are individually removable and replaceable.

As shown in Fig. 1, the test unit 12 is located adjacent the trunk unit 10. The test unit may, however, be located at any desired point, for example, at the extreme left of the switching mechanism in the position occupied by the No. 1 trunk unit.

The complete switching mechanism shown in Fig. 1 is assumed to serve 100 lines and to have 10 trunk lines for connection with calling subscribers' lines. The mechanism may, of course, also be used to perform the functions of selector or connector switches.

There is a line bank multiple comprising metallic conductors in the form of bars or strip-like members extending lengthwise of the switching mechanism serially through the trunk units and the test unit thereof. Since there are three bars per line, two line bars and a test bar, the 300 bars constitute 100 sets of bars, three bars per set, and provide terminal facilities for 100 subscribers' lines. When the switching mechanism is used to perform the functions of finder switches, it handles the outgoing calls from a group of 100 subscribers' lines which are connected to the line bars in the 100 sets of bars, respectively. A similar arrangement is also disclosed in Patent No. 2,396,077.

Each trunk unit is provided with a trunk line terminating therein and includes switching means for connecting any subscribers' line to such trunk line. For this purpose the subscribers' lines are divided into ten sub-groups of ten lines each, as in the case of mechanism shown in Patent No. 2,396,077; and each trunk unit is equipped with ten intermediate trunk elements for each conductor of its associated trunk line, together with circuit-closing means so constructed and arranged that the line and test bars of each subscribers' line in any sub-group may be connected to the intermediate trunk elements and any intermediate trunk element may be connected to the corresponding conductor of the trunk line terminating in the trunk unit.

The operation of the circuit-closing means in each trunk unit is controlled by two sets of selection magnets or solenoids which are individual to the trunk unit. There are ten tens selector solenoids and ten units selection solenoids. The tens solenoids are disposed in a transverse row near the top of the corresponding trunk unit, and the units solenoids are disposed in a vertical row at the front thereof. A gate or trunk magnet is provided on top of the trunk unit for the purpose of completing a connection as indicated by the operation of one of the tens selection solenoids in conjunction with one of the units selector solenoids. The test unit cooperates in the control of the units selection solenoids.

It will be understood, of course, that in the case of a small exchange having less than 100 lines, the switching mechanism need not be fully equipped. For example, in a 60-line exchange the switching mechanism requires only 60 sets of bars, or 180 bars altogether. The subscribers' lines may be divided into six sub-groups of ten lines each, or ten sub-groups of six lines each. The physical grouping of the sets of line and test bars in the line bank multiple corresponds to the grouping of the lines, and the selection solenoids and associated equipment corresponding to unused tens and units digits may be omitted. Thus, if there are only six sub-groups, only six tens selection solenoids are required, whereas if there are only six lines per sub-group, only six units selection solenoids are required. The latter arrangement is generally to be preferred, since it requires only six sets of intermediate trunk elements instead of ten.

The trunk or bank units 1–10 are identical in structure and operation. Therefore, the description of one trunk unit will suffice. The unit described below may be trunk unit No. 10, or trunk unit No. 1, or may be any one of the intervening trunk units 2–9. The following detailed explanations refer to certain trunk units merely for the sake of convenience.

It may also be mentioned at this point that the drawings are not to scale, and that some of the parts are shown in a more or less schematic manner, and in certain instances somewhat distorted at the expense of other parts, so as to bring out details.

Elements and features which may be presumed to be well known or which are described in detail in the previously mentioned patents will be covered herein only to the extent which is necessary for conveying a clear understanding of what is new.

Figure 7:
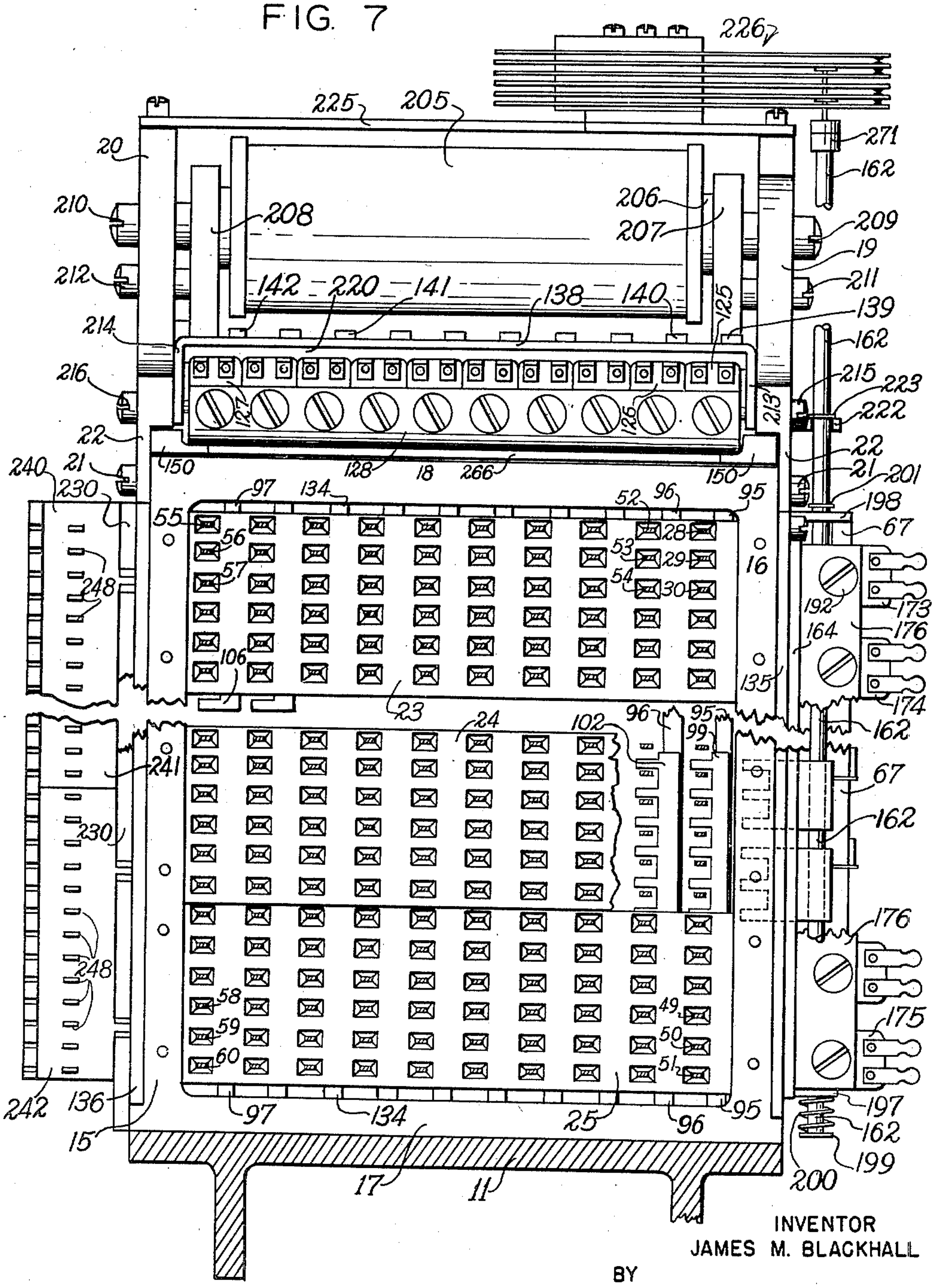
Fig. 7 shows a vertical section of the mechanism taken along lines 7—7 in Figs. 1, 2 and 3, with parts broken away to show details.

The supporting part of the trunk unit, as is particularly apparent from Fig. 7, is a frame similar to the one disclosed in the previously mentioned Patent No. 2,396,077. It comprises a rectangular lower portion having the sides 15—16, a transverse bottom portion 17, and a transverse top portion 18. This rectangular part of the frame structure accommodates the mounting means for the line bank multiple comprising the line and test bars, also the mounting means for the ten tens selection solenoids and associated parts, and the units actuators and coacting parts, as well as the trunk and the wiring terminal means individual to the trunk unit.

Extensions 19 and 20 are mounted on top of the sides of the rectangular frame by means of pivot screws 21 which hold the reduced lower ends 22 of the extensions at points in alignment with the horizontally extending transverse top part 18. These extensions accommodate the trunk or gate magnet 205, certain operating means for the tens and units actuators, and contact sets indicated at 226 and 227.

The mounting means for the line bank multiple comprising the 300 line and test bars comprises five plate-like mounting and supporting members made of insulating material, for example, Bakelite or polysterin, or other suitable insulating material. These plate-like members are mounted in the rectangular frame defined by the side walls 15—16 and bottom and transverse top portions 17—18. Three of these members are indicated in the drawings, Figs. 6 and 7, by the numerals 23—24—25. The member 23 is also visible in section in Fig. 3 and partially in section in Fig. 9. Each of these five mounting members is provided with six horizontally extending, vertically superposed rows of rectangular tapered holes, the constricted part of the taper pointing in the direction of the test unit and the flaring part pointing in the other direction. These five insulating members, each having sixty tapered holes, thus form thirty horizontally extending, vertically superposed rows of ten tapered holes each for the reception of the 300 line and test bars.

The trunk units are arranged side by side, as indicated in Fig. 1, and the 300 tapered holes in the supporting and mounting plates in each trunk unit are therefore in alignment, longitudinally of the apparatus, with the corresponding holes in the mounting plates of all other trunk units. The flaring side of each tapered hole is on the left of each trunk unit, as viewed in Figs. 1, 2 and 9. Therefore, the line and test bars can be pushed in at trunk unit No. 1 and successively through the corresponding tapered holes in trunk units 2 to 9, and finally through the holes in the plates 23—24—25 in trunk unit No. 10. The test unit disposed adjacent trunk unit No. 10 is likewise provided with mounting plates such as 23—24—25, and the line and test bars are pushed through the corresponding tapered holes such as 34—35—36 just as in the case of the trunk units.

Figures 9, 10, 11, 12:
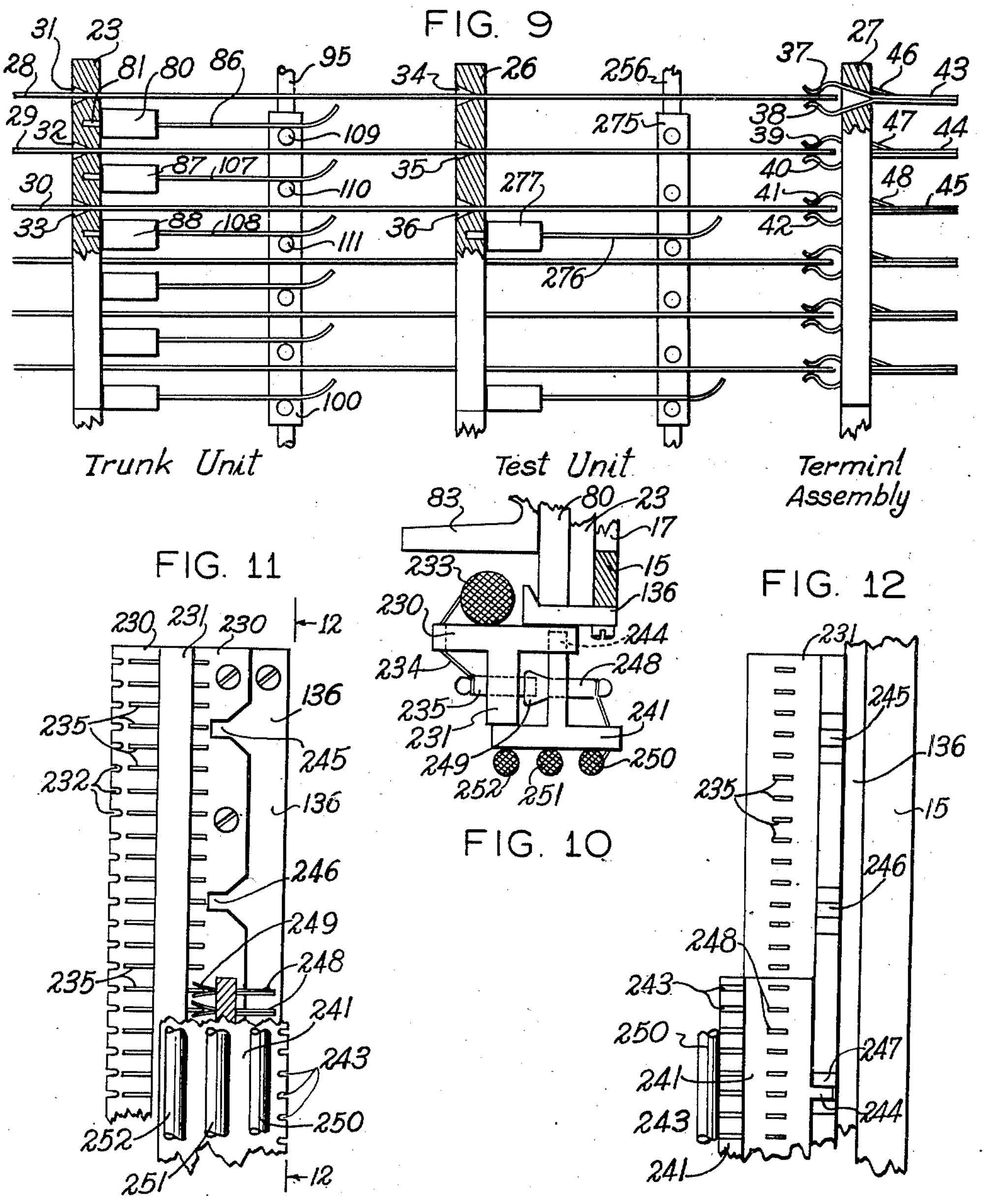
Fig. 9 is a schematic view of a portion of the line bank multiple at the trunk unit and adjacent test unit, showing also the terminal connections for the line and test bars.
Figs. 10, 11 and 12 illustrate details in connection with the new sectional terminal assembly provided for each bank or trunk unit.

The arrangement is particularly apparent from Fig. 9, which shows part of the line bank multiple at trunk unit No. 10, part of the bank of the test unit, and also part of the terminal assembly for anchoring the line and test bars.

Figure 2:
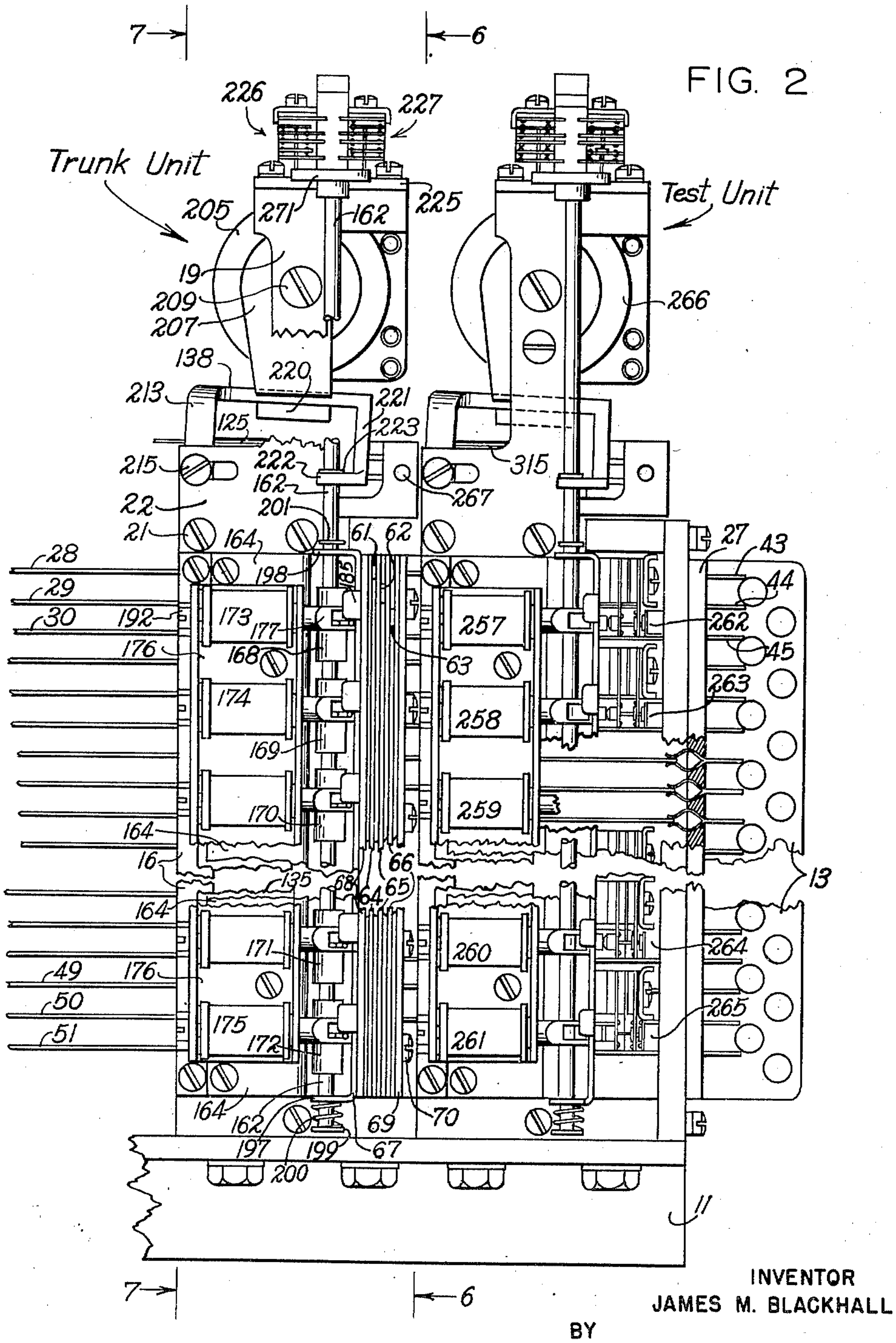
Fig. 2 illustrates a partial front view of the switching mechanism, with some parts in section and broken away to indicate details, showing one bank or trunk unit, the test unit of the apparatus, and the common terminal assembly. The combination may, for example, include the parts represented in Fig. 1 in prominent lines.
Figure 3:
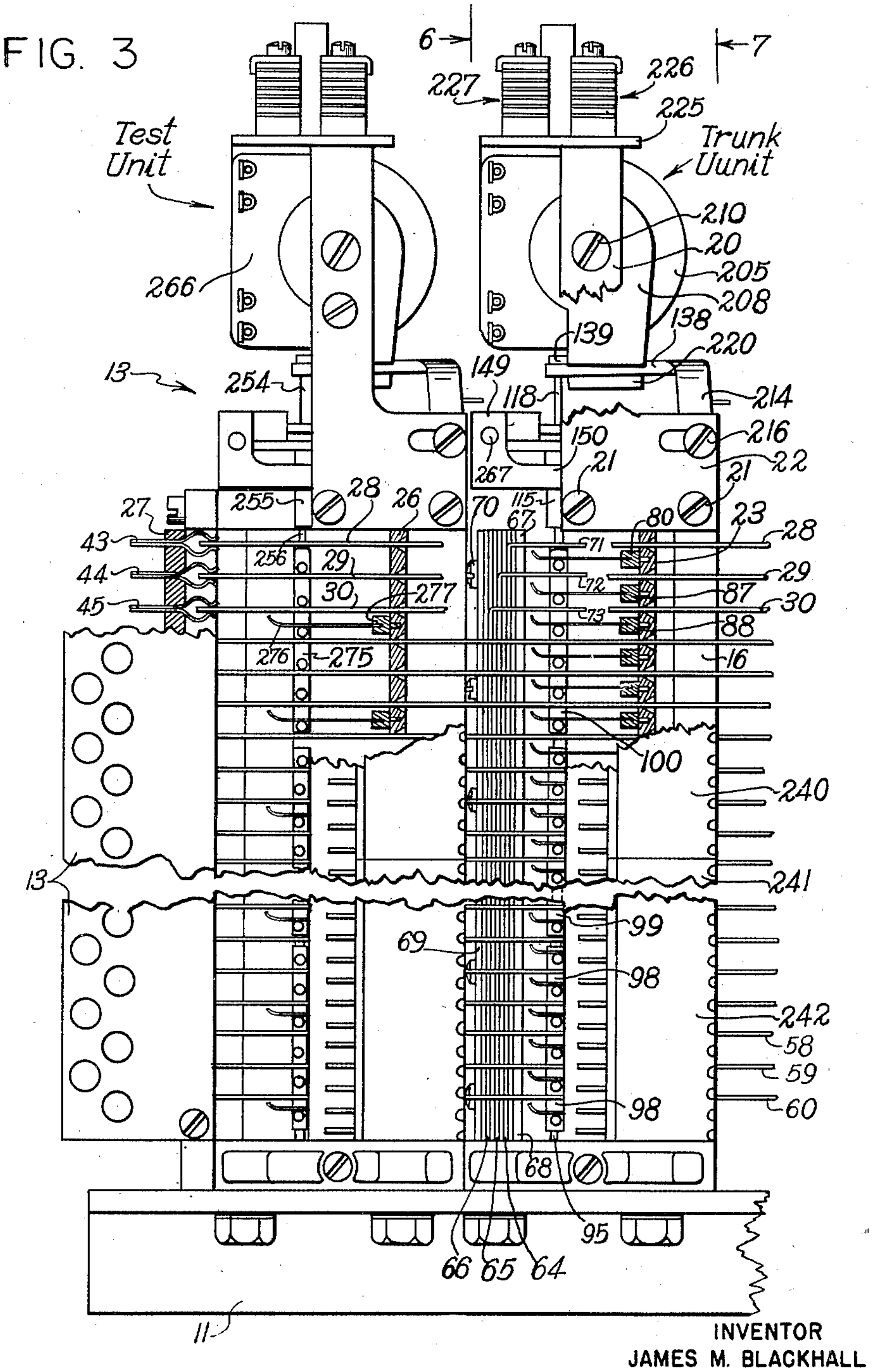
Fig. 3 shows a rear view of the apparatus illustrated in Fig. 2, with some parts in section and broken away to illustrate details.

Numeral 23 in Fig. 9 indicates the uppermost insulating mounting and supporting plate indicated by like reference numeral in Figs. 3 and 7. Numeral 26 indicates a similar insulating mounting and supporting plate provided in the test unit, also shown in Fig. 3. Numeral 27 indicates an insulating plate which is part of the terminal assembly carried by the test unit 13 in Fig. 1. Each of these insulating supporting and mounting plates 23 and 26 is provided with six rows of ten tapered holes each. The insulating plate 27 in the terminal assembly may be sectional or may be one large plate serving the entire unit. The line and test bars are pushed into place from left to right, as viewed in Figs. 1 and 9, and in reverse direction as viewed in Fig. 3, through the tapered holes in the successive insulating mounting and supporting plates of the trunk units. Line bars 28 and 29 and test bar 30 are thus pushed through the holes in the supporting plates in trunk units 1 to 9, finally through the holes 31, 32, 33 in the uppermost insulating plate 23 in trunk unit No. 10, then through holes 34, 35, 36 in the similar supporting plate 26 in the test unit, and finally into engagement with the prongs 37—38, 39—40, 41—42 in the insulating plate 27 in the terminal assembly. Terminal prongs 37 and 38 extend outwardly from the plate 27 forming a tab 43; prongs 39—40 extend likewise outwardly and form tab 44; and the prongs 41—42 form tab 45. Each tab is anchored by a resilient extension indicated at 46, 47 and 48, respectively. Each test and line bar of the remaining 99 subscribers' lines is put in place in a similar manner. The terminal assembly also includes the fanning plate 13, Figs. 1—3, provided with the usual holes for distributing the conductors which connect with the line and test bars through the medium of the tabs such as 43, 44 and 45, indicated in Fig. 9.

The numbering scheme is within certain limits a matter of choice. The present structure utilizes the scheme, also shown in Patent No. 2,396,077, according to which the line and test conductors are subdivided into ten vertically extending subscribers' groups. The line and test bars of the first sub-group extend through the supporting plates 23—24—25, vertically near the front edge of the trunk unit (left in Fig. 6 and right in Fig. 7). They include the bars 28—29—30 at the top and bars 49—50—51 at the bottom. The line and test bars of the tenth or last subscribers' subgroup extend through the supporting plates 23—24—25 near the rear edge of the trunk unit (right in Fig. 6 and left in Fig. 7). They include the bars 55—56—57 at the top and bars 58—59—60 at the bottom.

Figure 6:
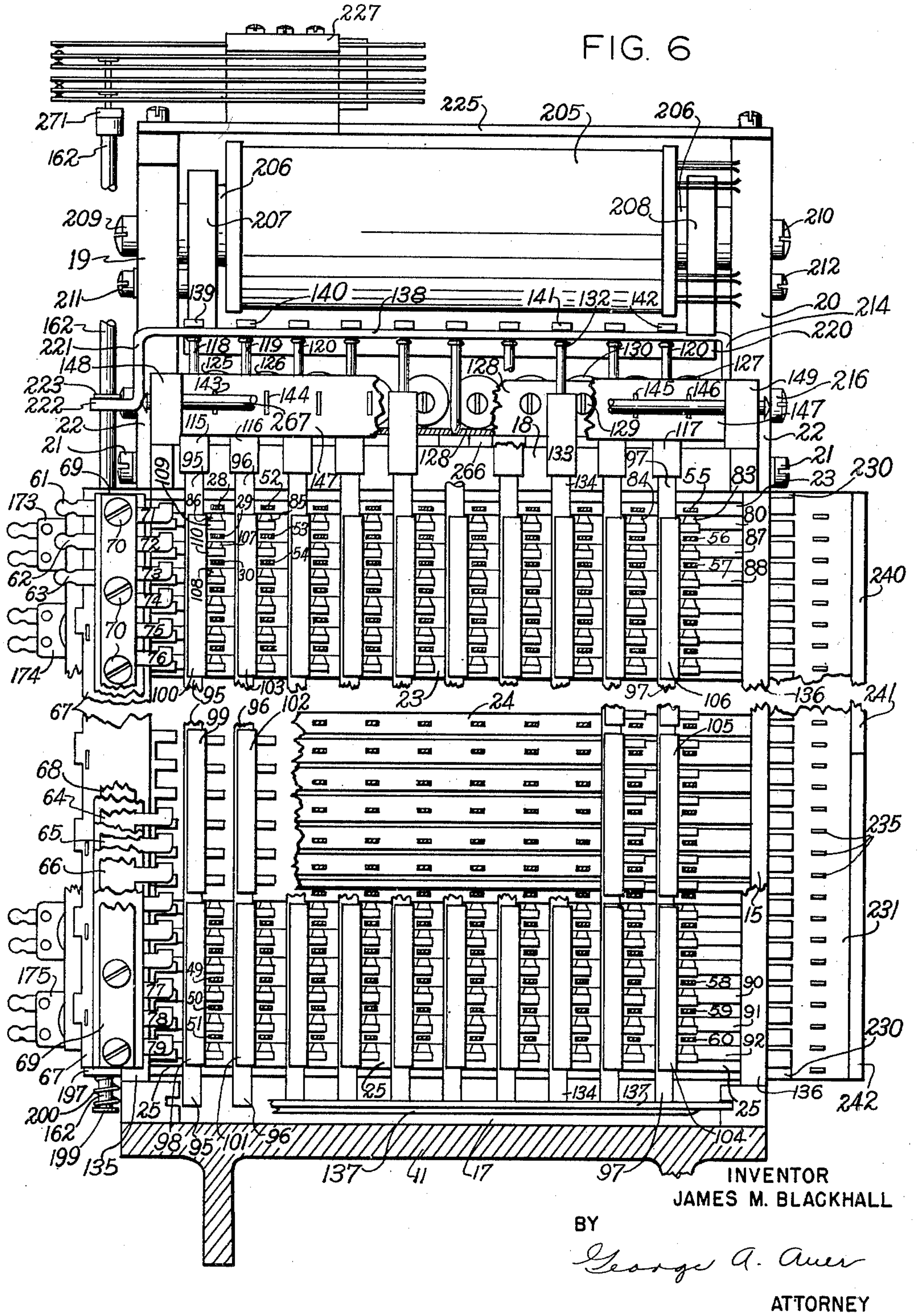
Fig. 6 represents a vertical section through the mechanism taken approximately along lines 6—6 in Figs. 1—3, with certain parts broken away to emphasize details.

In the first vertical subscribers' sub-group are the line numbers 11—10; in the second group are the numbers 21—20; the identical numbering is continued throughout the intervening subscribers' sub-groups; and finally in the last or tenth vertical subscribers' sub-group are disposed the line and test conductors belonging to the subscribers' lines 01—00. As shown in Figs. 6 and 7, the line and test bars belonging to the subscribers' line No. 11 include the line bars 28—29 and the test bar 30. Subscribers' line No. 12 is similarly represented by the three bars directly below the test bar 30. Subscribers' line No. 10 is represented at the bottom of the first subscribers' sub-group by the two line bars 49—50 and the test bar 51. Subscribers' line No. 21, being the first on top of the second subscribers' sub-group, includes the line bars 52—53 and the test bar 54. Subscribers' line No. 01 is represented by the line bars 55—56 and the test bar 57 in the last or tenth subscribers' sub-group at the top thereof; and subscribers' line No. 00 is represented by the line bars 58—59 and the test bar 60 at the bottom of the tenth subscribers' sub-group.

Next to be described are the means forming the terminals of the conductors of the trunk line serving the trunk unit, and the intermediate trunk elements which are provided for selectively connecting any one set of line and test bars of a given subscribers' line with the three corresponding conductors of the trunk line.

Figure 8:
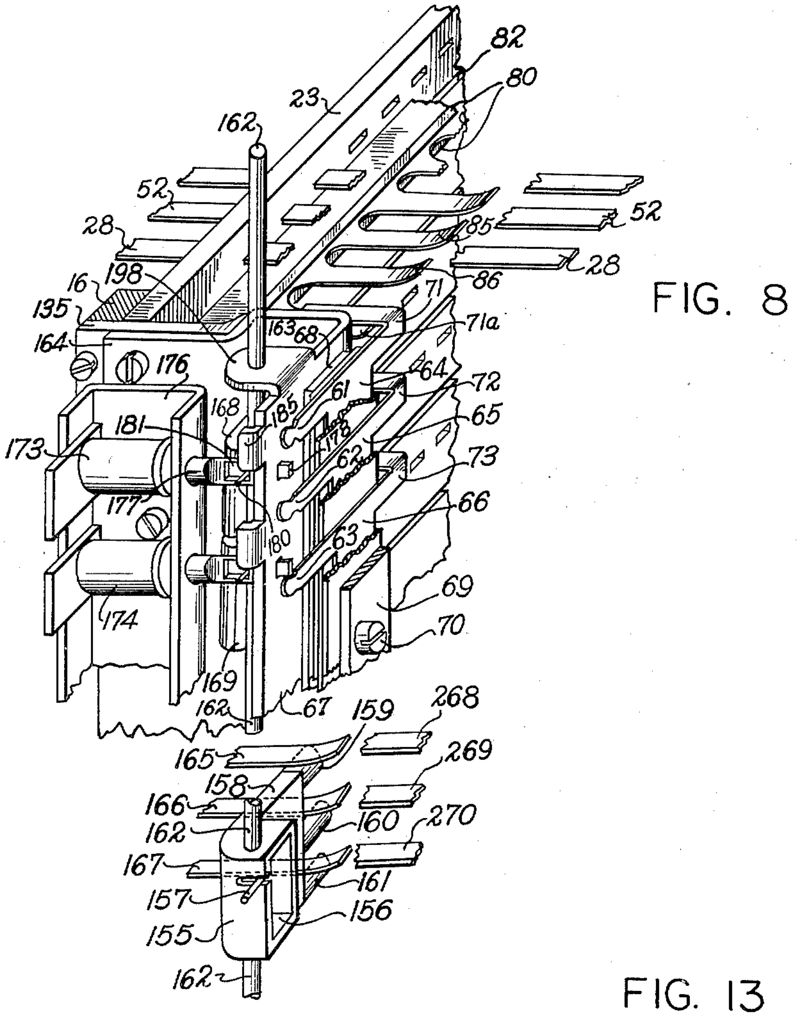
Fig. 8 illustrates a somewhat diagrammatic perspective view of part of a trunk or bank unit as seen from the front, and shows particularly the structure and coaction of parts in connection with the units actuators and in connection with the trunk conductor assembly.

The soldering tabs in which the three conductors of the trunk line terminate are indicated in Figs. 2, 6 and 8 by the numerals 61, 62 and 63. These tabs, as seen particularly in Fig. 8, are part of vertically extending strip-like members 64—65—66 which are disposed in insulated relation to each other in a pile mounted on the wall 67 of a guard or guide member provided for the units actuators. The pile is mounted on a bottom plate 68 by means of a top plate 69 held by screws 70. Some of these screws extend through holes in the assembly for attachment thereof to the wall 67. This trunk terminal assembly can thus be individually manufactured as a unit, and can be attached to the apparatus and removed therefrom as a unit.

The three trunk terminal members 64—65—66, having the tabs 61—62—63, are each provided with ten extensions, thus forming ten sets of stationary trunk contacts, each set having three contacts. Three of these sets are indicated (Fig. 6) at 71—72—73, 74—75—76, and 77—78—79. These trunk contacts provide access to the corresponding conductors of the trunk line, for ten associated sets of horizontally positioned and vertically superposed rows of intermediate trunk elements.

Each intermediate trunk element or link member is made of a strip forming ten contact fingers for selective engagement with associated line and test bars, and an eleventh contact finger for engagement with the associated stationary trunk contact. Thus, the trunk contacts 71—72—73 project rearwardly and inwardly from the trunk conductor strips 64—65—66, at the top of the bank of line and test bars and provide access to the trunk conductors, for three intermediate trunk elements disposed at the top of the rectangular supporting frame. The set of trunk contacts 74—75—76 serve a set of three intermediate trunk elements disposed just below; and the trunk extensions or contacts 77—78—79 are provided for coaction with a set of three intermediate trunk elements disposed at the bottom of the unit.

The trunk contacts 71—72—73 serve for connecting with the trunk conductors the line and test bars serving subscribers' lines Nos. 11, 21, 31, etc., 91 and 01. Similarly, trunk contacts 74—75—76 serve for connecting the line and test bars of subscribers' lines 12, 22, etc. to 92 and 02; and the three trunk contacts 77—78—79 projecting from the trunk terminal strips 64—65—66 at the bottom serve to connect, with the conductors of the trunk line, the line and test conductors of the subscribers' lines 10, 20, etc., to 90 and 00, which are disposed at the bottom of the bank.

The use of the trunk terminal strips 64—65—66 and the stationary trunk contacts 71—72—73, etc., radiating therefrom constitutes a permanent multiple which is free of contact trouble and eliminates soldering points. The structure forms a compact sub-unit. Its use facilitates manufacture, assembly and maintenance.

Each of the intermediate trunk elements comprises a strip made of insulating material having a tongue for insertion into a horizontal groove in the corresponding insulating supporting plate such as 23—24—25, and each is provided with a continuous strip of conductive material made of phosphor bronze or the like, which projects from the insulating strip and forms the resilient contact fingers disposed underneath associated line and test bars in parallel relation thereto. These intermediate trunk elements are similar in structure to those disclosed in Patent No. 2,396,077. For the sake of completeness, one of these elements may be briefly described by reference particularly to Figs. 3, 6, 8 and 9.

The insulating strip of the topmost intermediate trunk element, in any given trunk unit, may be the one indicated by numeral 80. This insulating strip is provided with a rearwardly projecting tongue 81, Fig. 9, which fits into the groove 82, Fig. 8, in the insulating supporting plate 23. The resilient contact fingers are formed integrally, e. g., from a strip of phosphor bronze. There are eleven such contact fingers extending from the insulating member 80. Four of these contact fingers are marked in Fig. 6 by numerals 83—84—85—86. The eleventh contact finger is not visible in Fig. 6, as it lies at the left of the contact finger 86 underneath the rearwardly extending portion of the stationary trunk contact 71. However, part of this eleventh contact finger may be seen in Fig. 8 at 71a. The contact fingers of this particular intermediate trunk element serve the purpose of selectively extending the line bars in the topmost row of the line bank multiple to the stationary trunk terminal contact 71. This includes the line bars such as 28, 52 and 55. The eleventh contact finger 71a (Fig. 8) serves to connect with the trunk contact 71 radiating from the trunk conductor strip 64. The second intermediate trunk element comprising the insulating member marked in Figs. 3, 6 and 9 by numeral 87. It is constructed just like the first trunk element, and has resilient contact fingers (107 in Fig. 9) projecting forwardly underneath the second horizontal row of line bars, including the line bars 29, 53 and 56. The eleventh contact finger of the second intermediate trunk element is disposed just underneath the stationary trunk contact member 72. The third intermediate trunk element having the insulating member 88 in Figs. 3, 6 and 9 forms similar contact fingers 108 underneath the test bars, including the test bars 30, 54 and 57, and an eleventh contact finger just underneath the stationary trunk contact 73.

Therefore, any one set of the topmost line and test bars of subscribers' lines disposed in the ten vertically disposed sub-groups of line and test bars of lines, such as lines 11, 21, etc., to 91 and 01, may be connected with the stationary trunk contacts 71—72—73, and thus with the trunk conductors connected to the tabs 61—62—63. The connection is obtained by selective operation of the corresponding set of the three vertically superposed contact fingers projecting from the trunk elements comprising the insulating members 80, 87, 88, and by actuation of the set of three associated eleventh contact fingers lying underneath the trunk extension members or stationary trunk contacts 71, 72, 73, respectively. For example, the line and test bars of subscribers' line No. 11 are connected with the trunk conductors by actuation of the three contact fingers 86, 107, 108 of the corresponding link members or trunk elements into engagement with the bars 28, 29, 30, and by the operation of the eleventh contact fingers of those trunk elements into engagement with the stationary trunk contacts 71, 72, 73.

Figure 5:
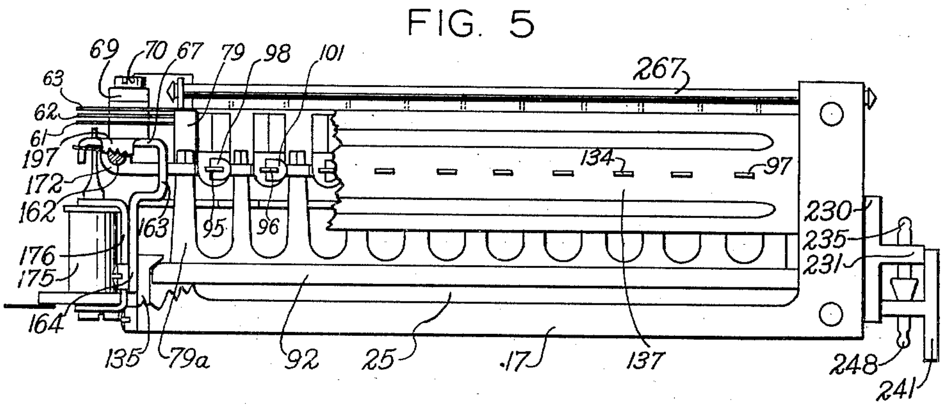
Fig. 5 is a bottom view of the trunk or bank unit, Fig. 4, with parts broken away to show details.

An intermediate trunk element such as described is provided under each of the thirty horizontal rows of line and test bars and each has an eleventh contact finger disposed underneath an associated stationary trunk contact. The lowermost set of line and test bars, which includes line No. 10, represented by bars 49—50—51 and adjacent lines 20, 30, etc., etc., and including line 00, represented by bars 58—59—60, may be similarly connected with the trunk conductors by means of the intermediate trunk elements comprising the insulating members 90—91—92 (Fig. 6) and contact fingers projecting therefrom, with eleventh contact fingers disposed underneath the stationary trunk contacts 77—78—79. The trunk element (having the insulating member 92) provided for coaction with the lowermost row of test bars, including test bars 51 and 60, is also shown in Fig. 5. It will be seen by referring to this figure that the eleventh contact finger 79a is disposed just underneath the stationary trunk contact 79. This contact finger is operable by the lowermost projection of the units actuator 172, while the remaining contact fingers of trunk element 92 are operable by the lowermost projections carried on the tens actuators, including the tens actuators 95, 96, 134 and 97.

The intermediate trunk elements are mounted alike, as described in connection with element 86 having the insulating strip 80 shown in Figs. 3, 8 and 9. Each insulating strip is anchored in its mounting plate by a tongue rearwardly projecting therefrom into a groove provided in the mounting plate. In order to hold the elements in position on the mounting plates, there are provided clamping means, comprising members 135 (Figs. 2, 5 and 8) and 136 (Figs. 6 and 10), one on each side of the frame and fastened thereto and having an angular projection which grips the ends of the insulating strips of the trunk elements and thus holds these elements on the mounting and supporting plates. Resilient spring-like fingers may be used in place of either one or both of these clamping members 135 and 136 in accordance with the disclosure in Patent No. 2,396,077. The clamping members 135—136 may be made in sections, if desired.

Ten tens actuators are provided for operating the contact fingers of the intermediate trunk elements into engagement with associated line and test bars. There is one tens actuator for each vertical row or sub-group of line and test bars, representing ten subscribers' lines, and each such tens actuator has thirty projections for operative engagement with the thirty contact fingers of the intermediate trunk elements disposed underneath the line and test conductors of each sub-group.

Each tens actuator is arranged and constructed similar to the tens actuators disclosed in Patent No. 2,396,077. It comprises a vertically extending, vertically movable bar carrying five insulating members molded on it, and each insulating member has six projections for engagement with six contact fingers of vertically correspondingly placed trunk elements. The bars are movably mounted at the bottom of the structure in a removably mounted journal plate 137 (Figs. 5 and 6) and extend upwardly alongside the corresponding vertical rows or sub-groups of line and test conductors representing the subscribers' lines. The tens actuating bar 95, Figs. 5, 6, 7 and 9, is thus provided for operatively actuating the contact fingers of the intermediate trunk elements into engagement with their associated line and test bars representing the first sub-group of lines, i. e., the subscribers' lines 11 to 10, which includes line bars 28—29 and 49—50 and test bars 30 and 60. The second tens bar 96 serves for operatively actuating the contact fingers of the intermediate trunk elements into engagement with the line and test bars in the second sub-group of subscribers' lines, numbers 21—20, which includes the line bars 52 and 53 and the test bar 54. Tens bar 134 in Figs. 5, 6 and 7 is provided for actuating the contact fingers of the intermediate trunk elements into engagement with the line and test bars of the eighth sub-group, representing subscribers' lines 81—80; and the tenth tens actuator bar 97 serves for operatively actuating the contact fingers of the intermediate trunk elements into engagement with the line and test bars of lines numbered 01 to 00, which includes the line bars 55—56 and 58—59 and the test bars 57 and 60.

As previously mentioned, each of the tens actuator bars is provided with five insulating members molded thereon, each insulating member carrying six projections. These projections underlie the associated resilient contact fingers of the intermediate trunk elements disposed in the corresponding vertical sub-groups. Three of the five insulating members carried by the tens bar 95 are indicated by the numerals 98, 99, 100. Three of the insulating members carried by the tens bar 96 are indicated by numerals 101, 102 and 103; and three of the insulating members carried by the bar 97 are marked by numerals 104, 105 and 106.

The connection of any one set of line and test bars belonging to any given line is dependent on the "tens selection," that is, on moving the corresponding tens actuator bar upwardly so as to actuate the resilient contact fingers of the corresponding intermediate trunk elements into engagement with the line and test bars through the medium of the projections extending from the insulating members of the associated tens bar. For example, if it is desired to connect contact fingers 86, 107, 108 (Figs. 6 and 9) of the intermediate trunk elements comprising the insulating strips 80, 87, 88 with the line bars 28—29 and the test conductor 30, respectively, of subscribers' line No. 11, it will be necessary to lift the tens bar 95 upwardly so as to allow the projections 109, 110 and 111 on the insulating member 100, Fig. 9, which are molded on the tens bar 95, to lift the contact fingers 86, 107 and 108. The line and test conductors of the subscriber line 11 are then extended to the trunk terminal assembly by way of the corresponding intermediate trunk elements. This does not complete the connection because it is also necessary to operate the eleventh contact fingers of these intermediate trunk elements into engagement with the associated trunk contacts 71—72—73, which is accomplished by the operation of a units actuator yet to be described.

The actual operation of any one of the tens actuator bars is preceded by the "tens selection", which will be explained later on. Completing the description of the physical structure of the tens actuators and associated parts, reference is again made particularly to Fig. 6 which indicates a clutch housing on top of each tens bar. Thus, there is a clutch housing carried by the tens bar 95, as indicated at 115. The clutch housing of the tens bar 96 is indicated at 116; that of the tens bar 134 is shown at 133; and the clutch housing of the last tens bar 97 is indicated by numeral 117.

The clutch housing for each tens actuator is similar to the one described in detail in Patent No. 2,396,077. It is provided with a recess containing a coiled spring anchored in the housing at one end and radially extending therefrom at the other end. A lifting pin projects into each clutch housing from the top. Thus, as shown in Fig. 6, lifting pin 118 projects into the clutch housing 115 of the tens bar 95; lifting pin 119 extends into the clutch housing 116 of the tens bar 96; lifting pin 132 coacts with clutch housing 133; and lifting pin 120 extends into the clutch housing 117 of the tens bar 97. The other lifting pins shown in Fig. 6 project similarly into the remaining associated clutch housings.

Each lifting pin extends upwardly through a hole in the armature 138 of the trunk or gate magnet 205 and is held from dropping out of the armature by a head or enlargement. The heads of pins 118, 119, 132 and 120 are indicated at 139, 140, 141 and 142, respectively. Each pin is rotatable within its hole and is provided with a bead just underneath the armature 138 to prevent axial movement thereof with respect to the armature. The clutch housings, and therewith the tens actuators, are guided in a horizontally disposed shelf member 266 in back of the guide and lock member 147.

The spring in each clutch housing is normally recoiled and open, permitting the associated lifting pin to move freely upwardly without at the same time lifting the clutch housing and therewith the associated tens bar. However, when a spring is tightened around its associated lifting pin, and the pin is then lifted by the armature 138, responsive to energization of the trunk magnet, it will lift the clutch housing and also the corresponding tens bar. The lifting of the remaining pins by the armature will have no effect on the remaining tens bars which have not been coupled by the tightening of their associated clutch springs. The "tens selection", that is to say, the tightening of the clutch spring in any one of the clutch housings for the purpose of coupling a tens pin with its tens bar, is accomplished electromagnetically by the tens solenoids or magnets which will be explained with reference to Figs. 2–4, 6 and 7.

There are ten tens selection solenoids, one for each of the ten clutch housings associated with the ten tens actuator bars. Solenoid 125 is provided for selecting the operation of the tens actuator bar 95 by tightening the spring in the clutch housing 115 around the lifting pin 118. Similarly, solenoid 126 is provided for selecting the operation of tens actuator bar 96 by tightening the spring in the clutch housing 116 around the lifting pin 119. The same is true of the remaining solenoids, including the solenoid 127 which serves to tighten the clutch spring in the clutch housing 117 around the lifting pin 120 so as to select and condition the tens actuator bar 97 for lifting when the lifting pin 120 is displaced upwardly by the armature 138 of the trunk magnet.

Figure 4:
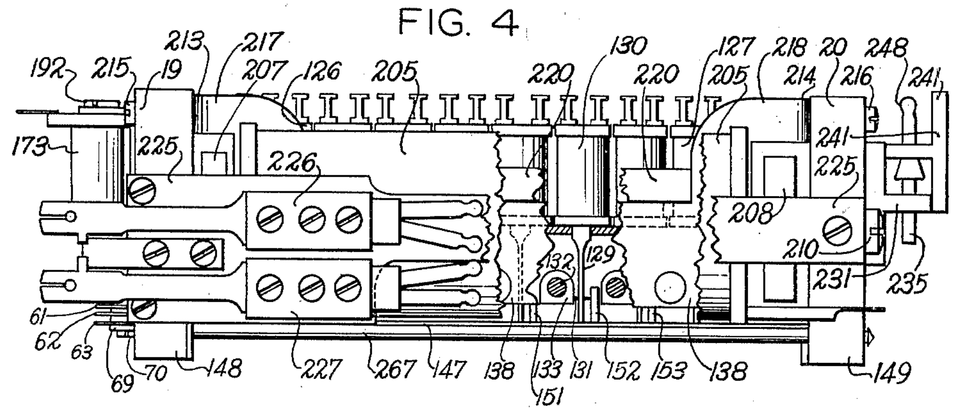
Fig. 4 represents a top view of the trunk unit shown in Fig. 2 at the left and in Fig. 3 at the right, with parts broken away and in section to show details.

The solenoids are mounted in a suitable channel member, indicated in Fig. 7 at 128, and each solenoid has a plunger such as 129, indicated in Fig. 4, in connection with the solenoid 130. The plunger 129 is adapted to tighten the spring in the clutch housing 133 by moving its free end 131, thereby tightening the spring around the lifting pin 132. The plungers of all the solenoids coact similarly with the coiled springs in the associated clutch housings of the corresponding tens actuator bars.

The free ends of the solenoid plungers are guided in holes such as 143—144—145—146 in a tens guide and lock member 147, Figs. 4 and 6, which is a strip-like structure supported at each end in the mountings 148 and 149. The latter are secured on the frame by means of arms 150 which underlie the upward frame extensions 19 and 20. The tens actuator guide shelf or plate 266 extends between the arms 150, as seen in Fig. 7.

The strip-like guide and lock member 147 carries a number of projections forming locking cams 151—152—153, Fig. 4. There is one such locking cam for each tens actuator clutch, and each locking cam is positioned just above the free end of the clutch spring projecting radially from the corresponding tens actuator clutch housing. Thus, the free end 131 of the clutch spring radiating from the clutch housing 133, which coacts with the lifting pin 132, is positioned just underneath the locking cam 152. Accordingly, assuming that the solenoid 130 in Fig. 4 is energized and attracts its plunger 129, this plunger will move the free end 131 of the clutch spring disposed in housing 133, so as to couple the clutch housing, and therewith the tens actuator rod 134, with the lifting pin 132. The free end 131 of the spring is thereby moved from underneath the cam 152 into vertical alignment with the upwardly extending inner edge thereof. The gate or trunk magnet 205 is then energized in a manner which will be presently explained, attracts its armature 138 (see Figs. 6 and 7), and moves the lifting pin 132, and therewith the clutch housing 133 and the tens actuator rod 134, upwardly to move the resilient contact fingers of the various intermediate trunk elements into engagement with the line and test bars of the corresponding vertically disposed sub-group of subscribers' lines. Tens actuators which have not been coupled by their clutches with their corresponding lifting pins remain in normal position. The free end 131 of the clutch spring coacting with the lifting pin 132, which has been moved to the edge of the locking cam 152 upon attraction of the plunger 129, is moved incident to the lifting of the tens actuator along the edge of the locking cam, and is thus locked in operated position, resting against the edge of the locking cam. Subsequent release of the solenoid 130 is ineffective to release the clutch spring within the clutch housing of the corresponding tens actuators. The tens actuator will remain in operated position so long as the gate or trunk magnet 205 is energized. Release of the operated tens actuator is accomplished by deenergization of the trunk magnet. The operation applies, of course, to each and every one of the tens actuators.

The rod-like element 267 mounted in the members 148—149 in back of the tens guard and locking plate 147 serves as a stop for limiting the outward displacement of the plungers of the tens solenoids.

As previously stated, there are ten units actuators, one for operating each of the ten sets of eleventh contact fingers of the intermediate trunk elements into engagment with their associated sets of stationary trunk contacts. Each such units actuator is made of suitable insulating material, e. g., Bakelite, and comprises, as particularly shown at the bottom of Fig. 8, a housing 155, which is rounded at one side and flat at the other, and is provided with a recess 156 forming a chamber. In this chamber is disposed a coiled clutch spring. One end of the spring is anchored in the housing 155, and the free end 157 projects therefrom. The units actuator also has a guide extension 158 and three projections or prongs 159—160—161. The units actuators, including the actuator 155, are freely movable on the units actuator lifting rod 162. They do not normally follow an upward displacement of the lifting rod except for that units actuator which is coupled to the lifting rod by the tightening of its clutch spring. The operation is similar as in the case of the clutches for the tens actuators.

The guide portion 158 of the units actuator is disposed in a guide opening or slot in the rear wall 163 of the units guide member. The guide is mounted in front of the switch structure by an extension 164. The three projections 159—160—161 of each units actuator thus extend rearwardly, as seen in Fig. 8, through the wall 163 of the guide, underneath a corresponding set of three auxiliary eleventh contact fingers of associated intermediate trunk elements. For example, the projections 159—161 of the units actuator 155 shown in Fig. 8 underlie the eleventh contact fingers 165—166—167. Assuming now that the units actuator 155, Fig. 8, is coupled to the lifting rod 162 by its spring 157, and further assuming that the lifting rod is displaced upwardly, it will be clear that the projections 159—161 will move the eleventh contact springs 165—167 to connect these springs with the stationary trunk contacts 268—269—270. The three intermediate trunk elements associated with the three eleventh contact fingers 165—166—167, are thus connected with the three trunk contacts 268—269—270 extending from the trunk terminal strips 64—65—66 in the same manner as the trunk contacts 71—72—73 extend from these strips.

Ten such units actuators coact with the lifting rod 162. The uppermost tens actuator is marked by numeral 168. It is adapted to connect the eleventh contact fingers of the intermediate trunk elements comprising the insulating members 86—87—88 into engagement with the sationary trunk contacts 71—72—73. Thus, if the line and test conductors of any one of the subscribers' lines in the top level of the trunk or switching unit, including the lines Nos. 11, 21, etc., etc., to No. 01, are to be connected to the trunk line, such connection is accomplished, first, by the operation of the corresponding tens actuator which serves the particular sub-group of lines, and second, by the operation of the units actuator 168 which serves to connect the eleventh contact fingers of the corresponding intermediate trunk elements with the stationary trunk contacts 71—72—73. The units actuators 169, 170, 155, 171, 172 (see also Fig. 2) serve in a similar manner for connecting the vertically successively downwardly disposed sets of eleventh contact fingers of the corresponding intermediate trunk elements with the associated stationary contacts of the trunk line.

There is one units solenoid provided for controlling the operation of each units actuator. Solenoid 173 controls the operation of the units actuator 168; solenoid 174 controls the operation of the units actuator 169 and so on; and the lowermost or tenth units solenoid 175 controls the operation of the units actuator 172. The solenoids are mounted in a channel member 176 which is attached at the front of the trunk unit, as is particularly apparent from Figs. 2, 5, 7 and 8. Each solenoid has a plunger, such as 177, coacting with the units actuator 168, the plunger having a reduced extension 178 which projects through a guide opening in the wall 67. Each plunger is also provided with an opening through which projects the free end of the corresponding clutch spring disposed in the associated units actuator housing. For example, as shown in Fig. 8, the free end 180 of the clutch spring within the units actuator 168 projects through the hole 181 in the plunger 177.

The wall 67 of the units actuator guide is provided with a number of cam-like extensions, the top extension being marked in Figs. 2 and 8 by the numeral 185. There are ten such cam-like extensions on the units actuator guide, one for each of the units actuators. The displacement of the free end of the clutch spring in each units actuator, by the associated solenoid, prepares for a locking operation which is completed by the upward movement of the corresponding units actuator responsive to the actuation of the units lifting rod 162 responsive to the energization of the gate or trunk magnet 205. The free end of the clutch spring will then slide upwardly along the edge of the associated locking cam such as 185, and will remain in this position even subsequent to deenergization of the corresponding units solenoid. Release of any upwardly displaced units actuator follows the deenergization of the gate or trunk magnet 205. The operation is similar to the locking and release action of the cams described in connection with the clutches which control the tens actuators.

The structure of one of the units solenoids, for example, solenoid 173, may be described with reference to the more or less diagrammatic representation shown in Fig. 13. Numeral 176 indicates the channel member for mounting the solenoids. The solenoid spool 190 has the usual flanges between which is provided the solenoid winding 173. The structure is mounted by means of a screw 192 which is provided at its forward end with a recess 193. The plunger 177 extends into the structure, as shown, and is provided with a recess 195. Within the recesses 193 and 195 of the screw extension and of the plunger is disposed a spring 196. The plunger 177 therefore always has a tendency to move outwardly to the right, as shown in Fig. 13. Its motion is limited by the side wall 67 of the units actuator guide. The reduced portion 178 of the plunger extends through the hole in the wall 67, as previously described. Numeral 181 indicates the opening in the plunger 177 through which extends the free end 180 of the clutch spring associated with the units actuator 168. It should be observed that the opening 181 in the plunger is relatively large as compared with the diameter of the clutch spring 180, and that the spring is normally disposed within the opening 181 near the bottom thereof. Upward displacement of the units actuator with its housing and the clutch spring moves the free end 180 of the clutch spring from the position shown in Fig. 13 in full lines upwardly to the position shown in dotted lines. The tension of the clutch spring also tends to bias the solenoid plunger outwardly. This action is supported by the action of the spring 196. Any tendency of the plunger to stick is thus counteracted. The tens solenoids are constructed similarly.

The units actuator or lifting rod 162 is movably journalled at the bottom in an angular extension or ear 197 projecting from the side wall 67 of the units actuator guide and is similarly journalled at the top of the guide in an extension or ear 198. The lifting rod is provided at the lower end with a washer 199, and a spring 200 is interposed between the washer and the journal member 197, for the purpose of biasing the actuator rod normally downwardly. A bead 201 is provided on the rod 162 for the purpose of keeping it in position during the assembly of the mechanism. The bead prevents the slipping-out of the actuator rod under the force of the spring 200 at a time when certain operating means, yet to be described, are not effective.

The gate or trunk magnet comprises the coil 205 having a core 206 on which are mounted the heel-pieces 207, 208. The core, with its heel-pieces, and the coil are mounted in the upright extensions 19—20 by means of the pivot screws 209—210. Screws 211—212 serve to hold the heel-pieces 207—208 in position.

The armature is an angular structure having the arms 213—214 which are rotatably mounted in the upright extensions 19—20 by means of pivot screws 215—216. Extensions 217—218 connect the armature proper 138 with the arms 213—214. The armature member 138 is provided, as will be remembered, with the holes through which project the lifting pins such as 118, 119, etc., which extend downwardly into the corresponding tens actuator clutch housings 115, 116, etc. A heel-piece 220 is provided on the lower side of the armature 138, its opposite ends projecting from the armature into alignment with the heel-pieces 207—208, respectively. Energization of the coil 205 of the trunk magnet results in swinging the armature in counter-clockwise direction, as seen in Fig. 2, and in clockwise direction, as seen in Fig. 3. This motion results in upward displacement of all the tens lifting pins 118, 119, etc., up to and including lifting pin 120. Only that lifting pin is effective to lift its associated tens actuator which has been coupled by the clutch spring actuated by the associated tens solenoid.

The armature 138 is also provided with an operating member for the units lifting rod 162 which is in the form of an angular arm 221 having an extension 222. The latter is slotted for the reception of the units lifting rod 162 just below the bead 223 formed on the rod. The rod 162 thus normally rests with its bead on the extension 222 of the armature, being biased in downward direction by its own weight and by the spring 200 at the lower end thereof.

It will be seen from the foregoing that attraction of the armature 138 responsive to energization of the trunk magnet 205 results in upward displacement of all the lifting pins provided for the tens actuators and also upward displacement of the units actuator lifting rod 162. This operation in turn lifting into operated position that tens actuator which has been coupled by its spring clutch with its associated lifting pin, and also that units actuator which has been coupled with the units lifting rod 162 by its associated clutch spring. Operative actuation of the trunk magnet 205 is preceded by the selective actuation of one of the tens solenoids and one of the units solenoids.

For example, if the line and test bars 28—29—30 of subscribers' line No. 11 are to be connected with the trunk conductors, it will be necessary to operate tens solenoid 125 so as to couple the lifting pin 118 with the clutch housing 115 carried by the tens actuator rod 95, and also to actuate solenoid 173 so as to couple the units actuator 168 with the units lifting rod 162. Subsequent energization of the trunk magnet 205 then lifts the tens actuator rod 95, effecting engagement of the resilient fingers 86, 107, 108 with the line and test bars, respectively, of the subscribers' line 11, and also lifts the units rod 162, therewith the units actuator 168, to connect the eleventh contact fingers on the corresponding intermediate trunk elements with the stationary trunk contacts 71, 72, 73. The operation as described completes the connection of the line and test bars of line No. 11 with the conductors of the trunk line.

A strip or plate-like cross-piece 225 is provided on top of the structure and connects the upward frame extensions 19, 20. Attached to this piece are contact sets 226—227, as shown in the drawings. The contact springs of these sets are operated by the bridge member 271 on top of the units lifting rod 162, which is loosely fitted on the units rod 162 so as to permit free angular motion of this rod. The free angular motion, i. e., possibility of rotation of the units lifting rod and also of the tens lifting pins is desirable and of practical importance for the proper operation and the life of the clutch springs. The contact pressure is propagated to the lifting rod and assists the downward bias thereof.

The new terminal assembly provided for each trunk unit is best explained with reference to Figs. 10-12, inclusive. It will be recalled that the clamp member 136 holding the insulating strips of the intermediate trunk elements in position on the mounting and supporting plates is attached to the side wall 15 of the frame of the trunk unit. Referring to Fig. 10, 15 shows the side wall of the frame in section, numeral 23 is the uppermost mounting and supporting plate for the line and test bars; and numeral 80 represents the uppermost intermediate trunk element or, rather to say, the insulating strip thereof. At 83 is indicated one of the resilient contact fingers extending from the strip 80.

The new terminal assembly comprises a T-shaped member having a base 230 and a rib 231 centrally projecting therefrom. This T-shaped member, with its base and its central rib-like projection, is made in one piece and extends vertically substantially throughout the height of the rectangular frame of the trunk unit at the rear thereof. See also Figs. 4, 5, 6 and 7. This T-shaped terminal member is suitably attached to the side of the frame or, rather to say, to the clamp member 136. The left edge of the base 230, as seen in Figs. 10 and 11, is provided with fanning slots 232. In back of the assembly may be placed the cable 233 which carries all the conductors for the corresponding trunk unit. The wires extending from the cable 233 are fanned through the slots 232, as indicated in connection with the wire 234 shown in Fig. 10. The central rib 231 is provided with conductive tabs 235, as many as may be required for the trunk unit, each tab forming at the left, Figs. 10 and 11, a soldering terminal for the attachment of the wires such as 234, and at the right an extension projecting from the rib 231, each extension functioning in the manner of a jack terminal. Each wire coming from the cable 233 is individually fanned into a corresponding fanning slot 232 and is soldered to one of the soldering tabs 235. The member 230 with its central rib 231 forms the terminal strip which is individual to the trunk unit and receives all the wires for the unit.

Inasmuch as there are three principal operating sections to be considered in the present instance, in connection with each trunk unit, it is desirable to place the incoming and outgoing conductors terminating in the cable 233 in such a manner on the terminal strip 230 that all wires or conductors for the respective sections of the trunk unit are disposed adjacent to each other, forming distinct groups. Thus, the wires for the units solenoids may be placed on the terminal strip 230 at a definite section thereof; the wires for the tens solenoids at another section; and the wires for the trunk magnet and for the contact springs on top of the unit may be placed in a third definite section of the terminal strip 230.

Sectional terminal strips are provided for coaction with the groups or sections of wires on the principal terminal strip 230. There are in the present instance three sectional terminal strips 240, 241 and 242, as seen in Figs. 6 and 7. Each is individual to a definite operating section of the trunk unit. For example, the top section 240 may be individual to the trunk magnet and to the spring assembly; the terminal section 241 may be individual to the tens actuator solenoids; and the terminal section 242 may be individual to the units solenoids.

Each sectional terminal comprises a T-shaped member, as indicated in Figs. 10—12, its base having at one edge the fanning slots 243, Figs. 11 and 12, and its central rib being provided with legs such as 244, Figs. 10 and 12. These legs are inserted in slots such as 245—246—247 in the right edge of the base 230 of the principal terminal strip. Each of the sectional terminal members 240—241—242 is provided with a number of conductive tabs forming at one side of its central rib prongs 249, for engagement with the jack-like extensions of the conductive tabs 235 of the principal terminal member, and soldering terminals 248 on the other side, to which may be soldered the ends of the wires which extend to the corresponding operating parts of the section served by the individual sectional strips 240—241—242, respectively. The sectional terminal members are thus constructed similarly, but serve different operating sections of the switching unit. The cable leading from the terminals 248 to the corresponding section of the apparatus which is served by the sectional terminal 240 is indicated at 250. The cable individual to the terminal section 241 is indicated at 251; and the cable individual to the lowermost section 242 of the terminal is indicated at 252.

Each section of the trunk unit can thus be individually wired and provided with a sectional terminal strip such as 240—241—242. All the wires are brought into the unit by the cable 233 and are fed to soldering tabs 235. The common terminal 230 with its wires can be attached and removed as a unit. After the various sections of the trunk unit are put in place and properly adjusted, the wires of each unit being connected to individual terminal sections, such sections are put in place simply by jacking them into position as described and as is apparent from Figs. 10–12.

The test unit of the mechanism is common to all the trunk units and is constructed similarly. It is provided only with intermediate trunk elements for coaction with the test conductors in the various levels. The arrangement is apparent from Figs. 3 and 9. Accordingly, only tens actuators are required, as indicated in Fig. 3. The placement and operation of these tens actuators corresponds to that described in connection with the trunk unit. The test unit therefore also carries the tens solenoids described in connection with the trunk unit, each solenoid adapted to couple a certain lifting pin with a spring contained in a clutch housing of each tens test actuator. One such lifting pin 254, extending into a clutch housing 255, is shown in Fig. 3, the clutch housing 255 being connected with the tens actuator rod 256. Each tens rod is provided with members such as 275, each carrying a number of projections just as the corresponding actuator members provided in each trunk unit. Only every third projection is effective, however, to actuate a contact finger on the associated intermediate trunk element into engagement with a test conductor. The contact finger 276, Figs. 3 and 9, projecting from the insulating member 277 serves the test conductor 30 of subscribers' line 11.

Units actuators are not required in the test unit, but solenoids 257—258—259—260—261 may be provided in their place, as shown in Fig. 2, which may correspond in structure to the solenoids 173—175 in the trunk unit. The function of these solenoids is, however, different. They are used or may be used, if desired, in the manner of ordinary relays operating suitably formed contacts indicated in Fig. 2 by the numerals 262—263—264—265. If desired, these relay solenoids may be omitted.

The structure and assembly of remaining parts of the test unit are in all other respects similar to the structure and assembly of corresponding parts of a trunk unit. This applies to the frame as well as to the trunk or gate magnet, to the tens test solenoids, the armature, and to the general features of the contact sets on top of the test unit.

The foregoing description completes the explanations with reference to the physical structures of the various parts of the apparatus. It is desirable to point out certain features directed to the assembly and adjustment.

The manner of assembly, attachment or removal of the parts which are disposed on the outside of the switching units will be sufficiently obvious so that no detailed explanation seems to be required. It will be clear, for example, that any trunk operating magnet assembly can be removed after taking out the pivot screws for the operating magnet armature yoke and the screws which hold the frame extensions 19—20 to the frame.

Any line or test bar may be removed from the line bank multiple by simply pulling it out at the left end of the switching mechanism as shown in Fig. 1. To replace a bar, it is pushed in until the end is gripped by the terminal at the terminal assembly 13 disposed at the right of the apparatus. The removal, for adjustment, repair or replacement, of an intermediate trunk element, from any one trunk unit, is briefly explained below.

It may be assumed, for example, that it is desired to remove the uppermost trunk element associated with the insulating member 80. The sectional terminal strips 240—242, Figs. 3, 6 and 7, are first detached from the common terminal strip 230. The common trunk terminal strip 230 is then removed as a unit by removal of the corresponding screws which hold it at the side of the frame. See Figs. 3, 4, 5 and 10—12. The clamp members 135, 136, best seen in Figs. 8 and 10, are then partially detached by loosening the corresponding screws which fasten them to the frame. Loosening of one of these clamp members at one side of the trunk unit may be sufficient. In case spring clips are used in place of these clamp members or in place of some of them, such as shown in Patent No. 2,396,077, the spring clips are, of course, loosened or removed. The corresponding trunk element with its insulating member, e. g., the member 80 may now be disengaged from its slot 82 in the supporting and mounting plate 23 (see Figs. 8 and 9) and could be withdrawn from the switching mechanism at the rear except for the fact that the tens actuators are in the way. This difficulty is provided for by arranging the parts so that the tens actuators may be moved to the right (Fig. 2) far enough to clear the ends of the contact fingers on the trunk element. In order to accomplish this, the pivot screws 215—216 for the armature are turned out far enough so that the heads thereof are outside their bearings. The trunk magnet armature yoke may now be moved to the right, as seen in Fig. 2, far enough to carry the tens actuators out of the way. It will be noted in this connection that the frame extensions 19—20 have slots in which the pivot screws 215—216 can move sideways. It should also be noted, as seen in Fig. 7 that the member 222, which operates the units lifting rod 162, has an open slot through which the lifting rod extends. The lifting rod therefore does not interfere with the described movement of the armature yoke.

The trunk element may now be removed for adjustment or repair, and may then be re-inserted or another trunk element may be put in its place, after which the parts which were removed or displaced are reassembled in their proper positions. Any intermediate trunk element can in this manner be taken out for repair or adjustment, or for replacement by another element.

A complete trunk unit may also be taken out if it should become necessary or desirable. This operation is briefly explained below.

It may be assumed, for example, that it is desired to remove the No. 5 trunk unit, Fig. 1. The trunk terminal sections 240—241—242 are first removed from the common trunk terminal 230—231 of this unit. This is done simply by pulling out each section 240—241—242, thereby disconnecting the jack prongs of the removable sections from the conductors carried by the central rib 231 of the common terminal strip 230. See Figs. 4, 5 and 10—12. The common terminal strip is then removed from the trunk unit. This leaves the trunk unit free for removal together with its terminal sections 240—241—242, except for the fact that the line bank multiple formed by the line and test-bars extend through the trunk unit. These bars are withdrawn, toward the left as seen in Fig. 1, far enough so that the right inner ends thereof clear the No. 5 unit. They need not be entirely withdrawn.

The No. 5 trunk unit may now be lifted out after first removing screws which attach it to the base 11. If the trunk unit is being taken out for repairs, it will be replaced after repairs are made. Otherwise a new trunk unit may be inserted, or if none is available, the switching mechanism may be reassembled without the No. 5 trunk unit. The procedure is the same if one or more new trunk units are to be added to a switching mechanism which was previously installed without the full equipment of trunk units; that is, the line and test bars have to be withdrawn to permit the removal or insertion of one or more trunk units, if desired.

The manufacture and assembly of parts is greatly facilitated by the unitary structure and arrangement of coacting sections of the switching units. For example, the units solenoids are mounted on the channel member 176, and all these solenoids and supports therefore can be manufactured and assembled as a sub-unit, and such sub-unit can then be put in place in an obvious manner. The same applies to the tens solenoids which are mounted on the channel member 128 and supported as a unit on the shelf 266.

The trunk terminal assembly forming the stationary trunk contacts throughout the various vertical levels of each trunk unit is likewise manufactured and put in place as a unitary subassembly. The multiple is formed simply by conductive strips which are assembled, in a pile, with insulating strips between the conductive parts, as previously explained, and is particularly apparent from Figs. 2 and 8.

The advantages resulting from the structure of the individual sectional trunk unit terminal provisions (see Figs. 3—5 and 10—12) are, it is believed, obvious. The conductors incoming to the trunk unit and outgoing from it are not wired into the unit in the usual sense, requiring the carrying of each wire to its terminal point, but are wired to the terminal strip which is individual to each trunk unit and carries all the wires common thereto. This strip is removably attached to the trunk unit. Individual operating sections of the trunk unit are wired to individual sectional terminal strips which may be removably attached (jacked) to corresponding sections of the common terminal strip. The arrangement facilities all steps in the production, assembly and maintenance of the apparatus.

Figs. 14 and 15 taken together, with Fig. 14 placed on top of Fig. 15, show a circuit diagram for the described switching mechanism when it is used to serve as a group of finder switches for connecting calling subscribers' lines with trunk lines. The diagram is intended for explanatory purposes only, to support the understanding of the mechanism and its operation. Therefore, details such as transmission of the dial tone, provisions for party lines, and certain supervisory circuits and the like have been omitted, and some of the individual circuit elements have been simplified so as to keep the drawings clear and to facilitate explanations.

Four subscribers' lines are shown in Fig. 14, comprising lines 11 and 12 of the first sub-group and lines 21 and 22 of the second sub-group. The sub-station A on line 11 is also shown.

The line conductors 300—301 of line 11 extend from sub-station A to the exchange, where they are provided with individual line equipment comprising the line relay 307 and the cut-off relay 306. The conductors 300—301 and the test conductor 302 then extend to the finder switching mechanism where they terminate in the line bars 28—29 and the test bar 30, respectively. These bars, it will be recalled, extend through all the trunk units of the apparatus. Outgoing calls, i. e., calls from the exchange to a subscriber's line such as line 11 are completed over the so-called "normal conductors" 303—304—305 which come from connectors. No connector mechanism is shown, but it may be of any suitable type, e. g., such as is described in Boswau Patent No. 2,307,757. Incoming calls from a subscriber to the exchange are handled as will be presently described.

The individual line equipment for lines 12, 21 and 22 is similar to the individual line equipment provided for line 11.

The drawing also shows diagrammatically parts of two sets of the intermediate trunk elements at the No. 1 trunk unit and corresponding parts of two sets of the intermediate trunk elements at the No. 2 trunk unit.

Two of the tens solenoids are indicated at 125—126, and two units solenoids are indicated at 173—174. These tens and units solenoids are also part of the switching mechanism of No. 1 trunk unit. The trunk or gate magnet of this trunk unit is shown in Fig. 15 at 205. The corresponding trunk or gate magnet of trunk unit No. 2 appears at 205*a*.

One of the tens actuators at No. 1 trunk unit is indicated in Fig. 14 at 95, and a units actuator is indicated in Fig. 15 at 163. The selection of the tens actuator 95 depends on the energization of the tens solenoid 125, and the selection of the units actuator 168 depends on the actuation of the units solenoid 173. The operation of both actuators depends on the energization of the trunk or gate magnet 205.

Equipment at the test unit includes the tens actuator 256, the operating magnet 263 and two of the tens solenoids 315 and 322. The tens solenoid 315 coacts with the tens actuator 256, which serves the first sub-group (lines 11, 12, etc.), and the tens solenoid 322 coacts with a similar actuator provided in the test unit for the second subgroup (lines 21, 22, etc.).

Relays 331—332, shown at the right end of Fig. 15, are the trunk distributor relays for the No. 1 and No. 2 trunk units, respectively. A similar relay is provided for each remaining trunk unit. The operated position of any one of these relays serves as a criterion that the trunk line terminating in the corresponding trunk unit is idle and selectable. When a trunk line is seized, its trunk distributing relay is deenergized. The operation of the various trunk distributor relays determines the sequence with which the trunk lines are put in service. Relay 351 is a common relay for resetting the trunk distributor relays.

Relays 341—342, shown at the left of Fig. 15, are the trunk test relays for the No. 1 and No. 2 trunk units, respectively. Each of the remaining trunk units is provided with a similar test relay. Associated with the trunk test relays is the start relay 350.

Numerals 329—330 in Fig. 14 indicate pilot and guard relays provided for the tens selection in the first and second sub-groups, and numerals 382 and 392 in Fig. 15 are similar pilot and guard relays provided for the units selection operation of the first and second digits in these sub-groups.

The circuit of each of the units guard and pilot relays such as 382 and the circuits of the trunk test relays 341—342 are provided with rectifiers 316—317, respectively, which have the same function as the rectifiers shown in connection with the units solenoids and test relays disclosed in the previously noted Boswau patent.

The conductors of the trunk line outgoing from No. 1 trunk unit are shown in Fig. 15 at 370—371—372, and the conductors of the trunk line outgoing from the trunk unit No. 2 appear at 373—374—375. These trunk lines extend to the next switching stage, which may be a selector or connector stage, depending on the size of the exchange.

The line conductors of each trunk line terminate in the next successive switching stage in a line relay having an associated slow-acting release relay, both of which are energized when the trunk line is taken into use. The test conductor of each trunk line is normally connected to negative battery, which constitutes an idle test potential, but when the release relay in the next switching stage is energized, responsive to seizure of the trunk line, negative battery is removed from the test conductor, and ground is connected thereto. The grounded test conductor then functions as a holding conductor. Circuit arrangements of this type are well known and are described, for example, in the previously mentioned Boswau patent.

The outgoing trunk lines are put in service consecutively, starting with the trunk line outgoing from No. 1 trunk unit. In order to be selectable for use on an outgoing call, a trunk line must not only be idle, as indicated by negative battery on the test conductor, it must also be awaiting selection, as indicated by the energized condition of the associated trunk distributor relay such as 331 or 332.

The operations which take place in extending a call from a sub-station such as station A, to the trunk line outgoing from No. 1 trunk unit and comprising conductors 370—372, will now be briefly described. The principal circuit provisions and elements which are involved in these operations are shown in Figs. 14—15 in prominent lines. The numbering of elements such as the tens and units actuators, their solenoids, as well as the gate or trunk magnets, and also the trunk elements and trunk contacts, corresponds to the numbering of these elements as shown in the previously discussed drawings.

The removal of the receiver at sub-station A of subscribers' line No. 11 closes a bridge across the line conductors 300—301 to complete a circuit for the line relay 307. Upon energizing, the line relay connects the cut-off relay 306 to the test conductor 302 at contact 312. Resistance 314 is at this moment in parallel with the cut-off relay. A negative test potential is thus supplied to the test conductor 302 through the cut-off relay 306 and resistance 314 in parallel. The negative test potential is now also on the private conductor 305 and prevents seizure of the calling line by calls coming from the connector.

The line relay 307 also grounds conductor 313 at contact 311, thereby closing a circuit for the tens guard and pilot relay 329 of subscribers' sub-group 1, which circuit extends from ground at contact 311, conductor 313, winding of pilot relay 329, contact 324, conductor 326, contact 328 of start relay 350, conductor 327, serially related contacts corresponding to contact 330*a* on other pilot and guard relays such as pilot relay 330, contact 330*a*, contact 325, to negative battery. At make contact 325 the pilot relay 329 closes a holding circuit for its own winding; at break contact 325 it disconnects battery from the conductor 327. Contact 325 should have make-break ductor 327. Contact 325 should have make-before-break adjustment. At contact 324 the winding of pilot relay 329 is disconnected from the conductor 326. The opening of contact 324 and break contact 325 prevents operation of any other pilot relay at this time.

The actuation of pilot relay 329 also effects closure of contact 323, thereby completing a circuit for all the tens solenoids 125 of all trunk units. These solenoids energize and actuate their associated clutches, thereby coupling the lifting pin of the tens actuators such as 95, in all trunk units, with their associated clutch housings. The tens actuator 95, provided in each trunk unit for the first sub-group of lines, is thus prepared for operation.

The pilot relay also closes its contact 393, thereby completing a circuit for the tens solenoid 315 of the test unit. This solenoid serves test selection purposes for the first sub-group of lines and couples its associated clutch to prepare for the operative actuation of the tens actuator 256 in the test unit.

At contact 394 the pilot relay 329 finally completes a circuit for the trunk or gate magnet 266 of the test unit. This magnet attracts its armature and lifts the tens actuator 256 which has been coupled by the operation of the tens solenoid 315. Contact 394 is adjusted so that it closes after contact 393 to allow operation of the solenoid 315 before effecting energization of the test trunk magnet 266. If desirable, a further definite time delay may be introduced by the addition of another relay which energizes responsive to closure of contact 394 and which in turn operates contacts for the energization of the trunk magnet 266.

The tens actuator 256 in the test unit moves the resilient contact finger 276 into engagement with the test bar 30, thereby extending the negative test potential on the test conductor to the conductor which includes the rectifier 316.

A circuit may now be traced for the energization of the units pilot and guard relay 382 shown in Fig. 15, which governs the units selection in the various subscribers' sub-groups. The circuit extends from negative battery by way of the cut-off relay 306 and resistance 314 in parallel, contact 312, test conductor 302, test bar 30, contact finger 276, rectifier 316, winding of pilot relay 382, contact 335, conductor 337, contact 339, conductor 338, serially related contacts such as 336 on other units pilot relays, contact 336, and contact 340, to ground. The cut-off relay does not energize over this circuit, due to the shunt-connected resistance 314.

At contact 334 the pilot relay 382 closes a circuit for the energization of all the units solenoids 173 of all trunk units. These units solenoids energize and, as explained in connection with the description of structural details of the switching mechanism, actuate their associated clutches, thereby coupling the units actuator such as 168, in each trunk unit, with the units lifting bar. The units actuator 168 is adapted to connect the eleventh contact fingers of the three topmost intermediate trunk elements 80—87—88, with the trunk contacts 71—72—73. The units actuator 168 in each trunk unit serving the corresponding digit in all the sub-groups of lines is thus prepared for operation.

A holding circuit for the winding of the pilot relay 382 is prepared at make contact 336, and at the break contact 336 ground is disconnected from conductor 338. Contact 336 should have a make-before-break adjustment. This operation, together with the opening of contact 335, prevents energization of another units guard and pilot relay at this time.

The pilot relay 382 also closes its contact 344, thereby closing a circuit for the start relay 350. The function of this start relay is to initiate the selection of an idle trunk line, that is to say, of an idle trunk unit. The proper tens and units solenoids have been energized in all the trunk units. The mechanism must now determine the trunk unit (trunk line) which is to be used for extending the call.

The start relay 350 at contacts 328 and 339 opens the connections between conductors 326—327 and conductors 337—338, respectively, in order to hold the energizing circuits of the tens and units pilot and guard relays 329 and 382 open until the apparatus is ready to handle another call.

Relay 350 also grounds the conductor 346, thereby completing a circuit for the trunk test relay 341. The trunk test which is thereby initiated determines which of the trunk lines is idle and awaiting service. The trunk line which is found in idle and selectable condition is then put in use for extending the call to the next switching stage by operating the trunk or gate magnet of the trunk unit in which such trunk line terminates.

Assuming now that the trunk line 370—372 outgoing from No. 1 trunk unit is idle and selectable, the circuit for the trunk test relay 341 will extend over a path from negative battery on the test conductor 372 of the trunk line, contact 391 of the trunk distributor relay 331, conductor 364, rectifier 317, contact 366, winding of test relay 341, contact 362, conductor 349, contacts 361 and 360, conductor 346, to ground at contact 345. A similar circuit is closed for the trunk test relay 342 and for other trunk test relays, provided the trunk lines with which such test relays are associated are in selectable condition. The test relay 342 and such other test relays accordingly start to energize at the same time as test relay 341. The test relay 341 is first choice, however, and the other test relays all drop back before any of them can fully energize, as will be understood from the circuit changes effected by the energization of test relay 341.

Relay 341 locks itself to grounded conductor 346 at contacts 347 and 367. Its holding circuit is independent of the trunk test conductor 372, the connection to which is broken at contact 366. At contact 360 the grounded conductor 346 is disconnected from conductor 349, and at contact 362 the winding of relay 341, now connected to conductor 346 by way of contact 347, is disconnected from conductor 349. The opening of contacts 360 and 362 prevents the complete energization of the test relay 342 and other test relays.

The energization of trunk test relay 341 determines the operation of the trunk or gate magnet 205 of trunk unit No. 1 in which the idle trunk line 370—372 terminates. The circuit for the trunk magnet is closed at contact 363 of the test relay 341 over conductor 377. The trunk magnet actuates its armature and raises the tens actuator 95 (Fig. 14) which has been coupled to its associated lifting pin by the energization of the tens solenoid 125, and also actuates the units lifting rod to raise the units actuator 168, which has been coupled to the units lifting rod by the energization of the units solenoid 173. The free ends of the clutch springs of the tens and units actuators now lock in engagement with their respective locking cams.

The tens actuator 95 connects the ten sets of line and test bars provided for the ten subscribers' lines in the first sub-group to the associated sets of intermediate trunk elements at the No. 1 trunk unit. Contact fingers 86, 107 and 108 of trunk elements 80, 87 and 88 are thus connected with the line and test bars 28—29—30, respectively, of the calling line No. 11. The units actuator 168 connects the eleventh fingers of the intermediate trunk elements with the associated stationary intermediate trunk contacts 71—72—73, thereby extending the calling line over the outgoing conductors 370—372 of the trunk line to the next switching stage.

The trunk magnet 205 also actuates the sets of contact springs disposed on top of the corresponding trunk unit, as explained before, which includes contacts 378 and 383. A locking circuit is now prepared for the trunk magnet at 378, and the circuit of the trunk distributor relay 331 is opened at 383. Relay 331 deenergizes and at contact 391 disconnects the test conductor 372 of the trunk line from conductor 364 leading to the trunk test relay 341.

The line relay connected at the next switching stage to the line conductors 370—371 of the outgoing trunk line now energizes. Its associated release relay also energizes, disconnects the test conductor 372 from negative battery and connects it to ground, thus completing the locking circuit for the trunk magnet 205 over the resistance 379. The locking circuit maintains the magnet 205 energized after deenergization of the test relay 341.

The cut-off relay 306 of the calling line 11 is now energized over a circuit which extends from the grounded test conductor 372 of the trunk line by way of the trunk contact 73, associated eleventh contact finger operated by the units actuator 168, conductive strip of trunk element 88, contact finger 108 operated by the tens actuator 95, test bar 30, test conductor 302, contact 312, and winding of the cut-off relay 306, to negative battery. At contact 308 the cut-off relay disconnects the resistance 314 and locks itself to the test conductor 302.

The line relay is disconnected at contacts 309—310 and, upon de-energizing, disconnects ground from conductor 313, thus opening the circuit for the tens pilot and guard relay 329. The latter deenergizes and disconnects the tens solenoids 125 of the various trunk units as well as the tens solenoid 315 and the trunk magnet 266 of the test unit. The tens actuator 256 in the test unit is restored upon deenergization of the magnet 266, and the test conductors of the lines in the first sub-group are disconnected from the units pilot and guard relays such as 382.

Ground on the test conductor 372 not only completes a circuit for the cut-off relay 306 with the above described results, but also short-circuits the units pilot and guard relay 382, which deenergizes before it is disconnected from the test bar 30 by the release of the actuator 256. Upon deenergizing, pilot relay 382 removes ground at contact 344, to restore the start relay 350, and opens contact 334 to deenergize the units solenoids 173 of the various trunk units. At its remaining contacts relay 382 restores the normal condition with respect to conductors 337—338. The deenergization of the start relay breaks the circuit for the test relay 341 at contact 345 and restores the normal condition with respect to conductors 326—327 and 337—338, respectively.

The deenergization of the tens and units solenoids 125 and 173, respectively, in the trunk unit No. 1 has no effect, so far as the established connection is concerned, because the corresponding tens and units clutches are held in operated position by the engagement of the clutch springs with their associated locking cams. The tens actuator 95 and the units actuator 168 in the No. 1 trunk unit remain in operated position so long as the trunk magnet 205 is energized.

The calling line has been extended to the next switching stage, and the mechanism is now ready to handle another call.

It should be noted that, if another line in the first sub-group, for example, line 12, initiates a call before the line relay 307 restores, the tens pilot and guard relay 329 serving this sub-group will be held operated. Therefore, the tens solenoid 125 of the trunk unit, as well as the tens solenoid 315 of the test unit, and the gate magnet 266 of the test unit will be held operated. The units guard and pilot relay 382 deenergizes, however, when short-circuited by the grounding of test conductor 372 and, upon closure of contact 339 on the start relay 350, another units guard and pilot relay will be energized. If the line 12 is calling, as assumed above, the units pilot relay 392 provided for the second digit control in the first sub-group will be energized.

When the calling subscriber at sub-station A restores his receiver, at the termination of the call, the connection is released in known manner, and at the next switching stage ground is disconnected from the test conductor 372 and negative battery is substituted. The cut-off relay 306 and the trunk or gate magnet 205 are accordingly deenergized. Cut-off relay 306 restores the normal condition of the individual line equipment, and deenergization of the trunk magnet causes release of the tens and units actuators 95 and 168, respectively, thus returning the No. 1 trunk unit to normal.

The next call is extended over trunk line 373—375, terminating at No. 2 trunk unit, provided that this trunk line is idle and that its trunk distributor relay 332 is energized as shown in the drawing. The trunk-line 373—375 is taken into use even though the trunk line 370—372 may now be idle, because the trunk distributor relay 331 associated with trunk line 370—372 has been deenergized and its contact 391 is open. When the trunk magnet 205*a* of the No. 2 unit is energized, it causes deenergization of the trunk distributor relay 332, and the remaining distributor relays become deenergized in like manner in the sequence in which their associated trunk lines are seized. When the last trunk line is taken into use, the last trunk distributor relay is deenergized and a circuit is completed for the reset relay 351 over serially related contacts such as 380—381 of the various deenergized distributor relays. Relay 351, upon energizing, completes parallel energizing circuits for the trunk distributor relays of all idle trunk lines. These relays energize and lock up, as shown in the case of relays 331—332, and open the circuit of the reset relay 351. The idle trunk lines associated with the energized trunk distributor relays are thus made available for use by the closure of their contacts such as 391.

Changes may be made within the scope and spirit of the following claims in which is defined what is believed to be new and desired to have protected by Letters Patent of the United States.

I claim:

1. In a switching unit for use in an automatic telephone system of the crossbar or coordinate type, a plurality of contact actuators, a clutch housing carried by each actuator, an operating member for each actuator normally extending into the clutch housing thereof, clutch means in each clutch housing, control means for selectively operating said clutch means to couple any one of said actuators selectively with its corresponding operating member, and an electromagnet for moving all said operating members for the purpose of operatively actuating the actuator which has been coupled with its associated operating member.

2. The structure and combination defined in claim 1, wherein said control means comprises a plurality of solenoids one for controlling the operation of each of said clutch means.

3. The structure and combination defined in claim 1, wherein said control means comprises a plurality of solenoids one for each of said clutch means, and means for mounting all of said solenoids in said switching device as a unitary sub-assembly which is individually attachable thereto and individually removable therefrom.

4. The structure and combination defined in claim 1, together with an auxilary operating member, a plurality of auxiliary contact actuators associated with said auxiliary operating member, clutch means individual to each auxiliary contact actuator, and means for selectively operating the clutch means associated with said auxiliary actuators to couple any one of such auxiliary actuators with said auxiliary operating member.

5. The structure and combination defined in claim 1, together with an auxiliary operating member, a plurality of auxiliary contact actuators associated with said auxiliary operating member, clutch means individual to each auxiliary contact actuator, a solenoid individual to each clutch means for selectively actuating such clutch means to couple its corresponding auxiliary actuator with said auxiliary operating member, and means associated with said electromagnet for operatively actuating said auxiliary operating member.

6. The structure and combination defined in claim 1, together with a plurality of auxiliary contact actuators, an auxiliary operating member common to all said auxiliary contact actuators, clutch means individual to each auxiliary contact actuator, a plurality of solenoids one for each of said clutch means to couple the corresponding auxiliary actuators selectively with said auxiliary operating member, and means for mounting all of said solenoids in said switching unit as a unitary sub-assembly which is individually attachable thereto and individually removable therefrom.

7. In a switching unit for use in an automatic telephone system of the crossbar or coordinate type, a plurality of contact actuators each carrying a plurality of contact-actuating members laterally projecting therefrom longitudinally thereof for coaction with associated movable contact springs, an operating member common to all said actuators, clutch means carried by each actuator, control means for selectively operating any one of said clutch means to couple any one actuator selectively with said common operating member, and an electromagnet having an armature for moving said common operating member responsive to energization thereof to move the actuator which has been coupled with such operating member for the purpose of operatively actuating the contact springs associated with the contact-actuating members of such actuator.

8. The structure and combination defined in claim 7, wherein said control means comprises a plurality of solenoids, there being one solenoid for individually operating the clutch means carried by each contact actuator.

9. The structure and combination defined in claim 7, wherein said control means comprises a plurality of solenoids, there being one solenoid for individually operating the clutch means carried by each contact actuator, and means for mounting all of said solenoids as a unitary subassembly which is individually attachable to the switching unit and individually removable therefrom.

10. The structure and combination defined in claim 7, together with a trunk line having a plurality of conductors terminating in said switching unit, a conductive strip for each conductor of said trunk line, and a plurality of integral extensions radiating from each strip to form sets of stationary intermediate trunk contacts for coaction with the movable contacts controlled by the contact-actuating members of each of said actuators.

11. In a switching unit for use in an automatic telephone system of the crossbar or coordinate type having a plurality of tens actuators each for operatively actuating a plurality of sets of movable contacts of intermediate trunk links into engagement with corresponding sets of relatively stationary line bars, an individual tens operating member for each tens actuator, individual clutch means for selectively coupling each tens actuator with its operating member, a plurality of units actuators each for operatively actuating movable contacts of an associated set of intermediate trunk links into engagement with relatively stationary trunk conductors, a common units operating member for said units actuators, individual clutch means for selectively coupling each units actuator with said common units operating member, a selection control device individual to said switching unit for selectively operating the clutch means of said tens and said units actuators, and an electromagnet for operatively actuating the tens and the units actuators which have been coupled with their associated tens and units operating members to extend a set of line bars to said trunk conductors.

12. The structure and combination defined in claim 11, wherein said selection control device comprises two groups of solenoids, one group having a plurality of solenoids for selectively actuating the clutch means of said tens actuators and the other group having a plurality of solenoids for selectively actuating the clutch means of said units solenoids.

13. The structure and combination defined in claim 11, wherein said selection control device comprises two groups of solenoids, one group having a plurality of solenoids for selectively actuating the clutch means of said tens actuators and the other group having a plurality of solenoids for selectively actuating the clutch means of said units solenoids, and means for mounting the solenoids of each group on said switching unit as a unitary sub-assembly which is individually attachable thereto and individually removable therefrom.

14. In a switching unit for use in an automatic telephone system of the crossbar of coordinate type, sets of movable contacts arranged in a plurality of groups arranged side by side, an actuator for each group arranged alongside its corresponding group and having contact-actuating members laterally projecting therefrom longitudinally thereof for coaction with the corresponding movable contacts of said sets of contacts, operating means for said actuators whereby each actuator is caused to move for operatively actuating the movable sets of contacts in its group, clutch means for selectively coupling said actuators with said operating means, and a control device individual to said switching unit for selectively operating said clutch means to couple any one actuator selectively with said operating means.

15. The structure and combination defined in claim 14, wherein each actuator carries clutch means individual thereto, said control device comprising a plurality of solenoids one for individually actuating each clutch means.

16. The structure and combination defined in claim 14, wherein each actuator carries clutch means individual thereto, said control device comprising a plurality of solenoids one for individually actuating each clutch means, and means for mounting all of said solenoids in said switching unit as a unitary sub-assembly which is individually attachable thereto and individually removable therefrom.

17. The structure and combination defined in claim 14, together with a pluraliy of conductors terminating in said switching unit constituting a trunk line, a plurality of auxiliary actuators each adapted to connect an actuated set of movable contacts with the conductors of said trunk line, a separate operating member common to all of said auxiliary actuators, clutch means individual to each auxiliary actuator for effecting coupling thereof with the common operating member, and a second control device individual to said switching unit for selectively operating the clutch means of said auxiliary actuators to couple any one of such actuators selectively with said common operating member.

18. In a switching unit for use in an automatic telephone system of the crossbar or coordinate type, a plurality of sets of contacts, each set comprising a plurality of movable contact springs, said sets of contacts being arranged in a row extending in a common plane, a plurality of conductive strips disposed in insulated relation to each other and mounted on said switching unit as a unitary sub-assembly in a plane paralleling the plane of said sets of contacts, integral extensions radiating from said strips and forming sets of stationary contacts for coaction with corresponding sets of said movable contact springs, a trunk line having a plurality of conductors terminating in said strips, respectively, and an actuator for each set of movable contact springs to effect engagement thereof with the corresponding set of coacting stationary contacts.

19. The structure and combination defined in claim 18, together with a common operating member for all of said actuators, and control means individual to said switching unit for selectively coupling any one of said actuators with said operating member.

20. The structure and combination defined in claim 18, together with a common operating member for all of said actuators, control means individual to said switching unit for selectively coupling any one of said actuators with said operating member, said control means comprising a solenoid for each of said actuators, and means for mounting all of said solenoids as a unitary sub-assembly which is individual to said switching unit and is individually attachable thereto and removable therefrom.

21. In an automatic telephone system of the coordinate or crossbar type having a plurality of individual switching units arranged side by side, a trunk line individual to each switching unit comprising a plurality of conductors terminating therein, a plurality of sets of line bars extending through all of said switching units, tens and units actuators in each switching unit for connecting any one set of said line bars with said trunk conductors, individual control means in each switching unit for selecting said actuators for operation, and means for operatively actuating selected actuators to establish connection between a particular set of line bars and said trunk conductors.

22. In a switching mechanism for use in an automatic telephone system of the crossbar or coordinate type, a plurality of trunk units supported side by side on a suitable base, a plurality of sets of line bars extending through all said trunk units, a trunk line comprising a plurality of trunk conductors terminating in each trunk unit, individual tens and units selection control means for each trunk unit to determine the connection of a particular set of line bars with the trunk conductors terminating in the corresponding trunk unit, and connecting means in each trunk unit selectively operatively controlled by the individual selection control means thereof to effect such connection.

23. In a telephone system of the crossbar or coordinate type having a switching apparatus comprising a bank of sets of line and test conductors arranged in tens groups in intersecting relationship with a plurality of switching units, each switching unit having a trunk line terminating therein and having switching means for selectively connecting any one set of said line and test conductors with the conductors of its associated trunk line, and circuit means for controlling said switching means, said circuit means comprising a tens pilot relay for each tens group of line and test conductors to determine the selection thereof, a units pilot relay for determining the selection of line and test conductors within each of said tens groups, and tens and units circuit-closing means selectively controlled by said pilot relays, respectively.

24. The telephone system and circuit means defined in claim 23, together with trunk selecting relay means controlled by said units pilot relay, and trunk magnet means controlled by said trunk selecting relay means for operating the tens and units circuit-closing means selectively controlled by said pilot relays.

25. The telephone system and circuit means defined in claim 23, wherein each of said tens and units pilot relays controls the selection of tens and units circuit-closing means, respectively, in all said switching units, together with a trunk selecting relay controlled by said units pilot relay in each switching unit, and circuit means controlled by said trunk selecting relay for actuating trunk magnet means of its associated switching unit for operatively actuating said tens and units circuit-closing means in its associated switching unit.

26. The system and circuit means defined in claim 23, together with a test unit common to all said switching units, tens selection means in said test unit controlled by said tens pilot relay, and circuit means controlled by said tens selection means in said test unit for controlling the operation of said units pilot relay.

27. The system and circuit means defined in claim 23, together with a guard circuit controlled by said tens pilot relay, said guard circuit comprising conductors connected in series relationship with contact means of corresponding tens pilot relays of all switching units whereby only one tens pilot relay can be operatively actuated at any one time.

28. The system and circuit means defined in claim 23, wherein a units pilot relay is provided for each digit selection within all of said tens groups, and a guard circuit controlled by said units pilot relay, said guard circuit comprising conductors connected in series relationship with contact means of corresponding units pilot relays of all switching units whereby only one units pilot relay can be operatively actuated at any one time.

29. In a telephone system of the crossbar or coordinate type having individual subscribers' line equipment including for each line a line and a cut-off relay, line and test conductors, respectively, extending from said line equipment and terminating in corresponding line and test bars, respectively, a finder switching mechanism having a plurality of trunk units and a trunk line terminating in each trunk unit, switching means in each trunk unit including tens and units actuators for connecting the line and test conductors of any subscriber's line with the corresponding conductors of said trunk line, and circuit means for determining and for controlling the operation of said switching means comprising a tens pilot relay individual to a sub-group of lines and controlled by the line equipment thereof, tens solenoid means individual to each trunk unit and controlled by said tens pilot relay for selecting the tens actuator in the associated trunk unit, a units pilot relay, and units solenoid means individual to each trunk unit and controlled by said units pilot relay for selecting the units actuator in the associated trunk unit.

30. The system and circuit means defined in claim 29, together with a test unit common to all said trunk units, tens actuator means in said test unit controlled by said tens pilot relay, and circuit means controlled by said tens actuator means in said test unit for controlling the operation of said units pilot relay.

31. The system and circuit means defined in claim 29, together with a test unit common to all said trunk units, tens actuator means in said test unit, tens solenoid means individual to said tens actuator means, circuit means governed by said tens pilot relay for selectively controlling the operation of said tens solenoid means in said test unit to determine the actuation of a particular tens actuator means thereof, and circuit means controlled by an actuated tens actuator in the test unit for governing the operation of said units pilot relay.

32. In an automatic telephone system of the crossbar or coordinate type, a switching unit comprising a generally rectangular frame, means in said frame for supporting a plurality of sets of line bars arranged in groups disposed side by side, a plurality of sets of intermediate trunk elements forming trunk links each having movable contacts, one for establishing connection with a corresponding line bar, a tens actuator for each group of line bars and associated movable contacts of said trunk elements for operatively actuating said movable contacts to engage the associated line bars, a tens selection control device disposed at one end of said frame for controlling the selective operation of said tens actuators to actuate said contacts to connect the line bars of a particular group with the trunk links corresponding to such group, a trunk line comprising a plurality of conductors terminating in said switching mechanism, a units actuator associated with each set of intermediate trunk elements forming said trunk link, and a units selection control device disposed at one side of said frame for controlling the selective operation of said units actuators to connect the movable contacts of a particular trunk link with the conductors of said trunk line.

33. The structure and combination defined in claim 32, wherein each said tens and said units selection control device comprises a plurality of solenoids one for each of its associated tens and units actuators.

34. The structure and combination defined in claim 32, wherein each said tens and said units selecting control device forms a unitary assembly which is individually removably attached to said frame.

35. The structure and combination defined in claim 32, wherein said units selection control device comprises a mounting member removably disposed at one side of the frame, said units actuators being movably secured on said mounting member, and a plurality of solenoids carried by said mounting member one for each units actuator to operate such actuator relative to its associated set of movable contacts formed by the corresponding trunk link.

36. The structure and combination defined in claim 32, wherein said units selection control device comprises a mounting member removably secured at one side of the frame, said units actuators being movably disposed on said mounting member, a plurality of solenoids carried by said mounting member one for each units actuator to operate such actuator relative to its associated set of movable contacts formed by the corresponding trunk link, and a plurality of members carried by said mounting member forming sets of stationary trunk contacts one set for coaction with each set of movable contacts associated with the corresponding trunk link.

37. In an automatic telephone system of the class described, a plurality of trunk units, a test unit common to all trunk units, a plurality of sets of line bars extending serially through all said trunk units and through said test unit, a trunk line comprising a plurality of trunk conductors terminating in each trunk unit, a plurality of tens actuators in each unit, and a plurality of tens selection means individual to each trunk unit for selecting any one of the tens actuators therein for operation to effect connection of a particular set of said line bars with the conductors of said trunk line.

38. In a switching mechanism for use in an automatic telephone system of the class described, a plurality of trunk units, a test unit common to said trunk units, a plurality of sets of line bars extending serially through all said trunk units and said test unit, a trunk line comprising a plurality of trunk conductors terminating in each trunk unit, a plurality of tens actuators in each unit, units actuators in each trunk unit, tens and units selection control means individual to each trunk unit for selecting tens and units actuators for operation, and tens selection control means individual to said test unit for governing the operative actuation of said tens actuators.

39. In an automatic telephone system of the class described, a plurality of individual switching units disposed side by side, a line bank multiple comprising a plurality of sets of conductor bars extending serially through all said switching units, a link comprising a plurality of conductors terminating in each switching unit, a plurality of tens and a plurality of units actuators in each switching unit, any two jointly actuated tens and units actuators being adapted to connect a particular set of conductor bars with said link conductors, and selection control means individual to each switching unit for determining the operative actuation of any pair of tens and units actuators.

40. In an automatic telephone system of the class described, a plurality of switching units disposed side by side, a line bank multiple comprising a plurality of sets of conductor bars arranged side by side in ten tens groups and extending serially through all said switching units, a link comprising a plurality of conductors terminating in each switching unit, a plurality of tens actuators individual to each switching unit, one for each tens group of said conductor bars, a plurality of units actuators individual to each switching unit, one for each units group of all said tens groups of said conductor bars, any two jointly actuated tens and units actuators being adapted to connect a particular set of conductor bars with said link conductors, and common selection control means individual to each switching unit for determining the operative actuation of any two tens and units actuators.

41. In a switching unit for use in an automatic telephone system of the class described, a removable sub-assembly comprising a plurality of sets of stationary contacts extending in a common plane and having a multiple for interconnecting like contacts of each set, a plurality of conductors forming a link terminating respectively in said multipled stationary contacts, a plurality of sets of movable contact fingers for each set of stationary contacts, an actuator for each set of movable contact fingers to effect engagement thereof with the contacts of the corresponding stationary contact set, an electromagnet for each set of movable contact fingers, and means for mounting all said electromagnets on said switching unit as a unitary sub-assembly thereof.

42. In a telephone system of the crossbar or coordinate type having a switching apparatus comprising a line bank multiple having sets of line and test conductors arranged in tens groups in intersecting relationship with a plurality of switching units, each switching unit having a link terminating therein comprising a plurality of conductors and having switching means for selectively connecting any one set of said line and test conductors with the conductors of its associated link, and circuit means for controlling said switching means, said circuit means comprising a tens pilot relay for each tens group of line and test conductors to determine the selection thereof, a units pilot relay for determining the selection of line and test conductors within each of said tens groups, and tens and units circuit closing means selectively controlled by said pilot relays, respectively.

43. In a telephone system of the crossbar or coordinate type having individual subscribers' line equipment including for each line a line and a cutoff relay, line and test conductors, respectively, extending from said line equipment and forming a line bank multiple comprising sets of line and test bars corresponding to subscribers' lines, respectively, a finder switching mechanism having a plurality of switching units disposed in intersecting relationship with the line and test bars of said line-bank multiple, a link terminating in each switching unit comprising a plurality of conductors, switching means in each switching unit including tens and units actuators for connecting the line and test conductors of any particular subscriber's line with the corresponding conductors of said link, and circuit means for determining and for controlling the operation of said switching means comprising a relay individual to a tens sub-group of lines and controlled by the line equipment thereof, tens solenoid means individual to each switching unit and controlled by said relay for selecting the tens actuator in the associated switching unit, a units relay, and units solenoid means individual to each switching unit and controlled by said units relay for selecting the units actuator in the associated switching unit.

JAMES M. BLACKHALL.

REFERENCES CITED

The following references are of record in the file of this patent:

UNITED STATES PATENTS

| Number | Name | Date |
|---|---|---|
| 1,567,532 | Marburg | Dec. 29, 1925 |
| 2,016,448 | Milne | Oct. 8, 1935 |
| 2,113,215 | Magrath | Apr. 5, 1938 |
| 2,166,764 | Matthies | July 18, 1939 |
| 2,185,724 | Cooper | Jan. 2, 1940 |
| 2,311,800 | Williams | Feb. 23, 1943 |
| 2,322,219 | Boswau | June 22, 1943 |
| 2,364,146 | Joel | Dec. 5, 1944 |
| 2,392,089 | Hersey | Jan. 1, 1946 |